United States Patent [19]
Barry et al.

[11] Patent Number: 5,517,641
[45] Date of Patent: May 14, 1996

[54] RESTARTABLE METHOD TO REORGANIZE DB2 TABLESPACE RECORDS BY DETERMINING NEW PHYSICAL POSITIONS FOR THE RECORDS PRIOR TO MOVING USING A NON SORTING TECHNIC

[75] Inventors: Richard E. Barry; Eisa A. ALeisa, both of Houston, Tex.

[73] Assignee: CDB Software, Inc., Houston, Tex.

[21] Appl. No.: 163,091

[22] Filed: Dec. 7, 1993

Related U.S. Application Data

[63] Continuation-in-part of Ser. No. 889,454, May 27, 1992, Pat. No. 5,408,654.

[51] Int. Cl.$^6$ ............................... G06F 7/24; G06F 17/30
[52] U.S. Cl. ................... 395/600; 364/251.6; 364/282.1; 364/283.4; 364/DIG. 1
[58] Field of Search ..................... 395/600, 425; 364/DIG. 1, DIG. 2, 251.6, 283.4, 282.1

[56] References Cited

U.S. PATENT DOCUMENTS

| | | | |
|---|---|---|---|
| 4,679,139 | 7/1987 | durbin | 395/425 |
| 4,890,226 | 12/1989 | Itoh | 395/425 |
| 5,034,914 | 7/1991 | Osterlund | 395/425 |
| 5,204,958 | 4/1993 | Cheng et al. | 395/600 |
| 5,222,235 | 6/1993 | Hentz et al. | 395/600 |
| 5,257,362 | 10/1993 | Menon | 395/425 |
| 5,274,805 | 12/1993 | Ferguson et al. | 395/600 |

OTHER PUBLICATIONS

Hauser et al. "DB2 2.3 REORG Tablespace Performance", DB Journal, Aug. 1992 pp. 24–29.

*Primary Examiner*—Thomas G. Black
*Assistant Examiner*—Jack M. Choules
*Attorney, Agent, or Firm*—Pravel, Hewitt, Kimball & Krieger

[57] ABSTRACT

An improved method to dramatically reduce the time required to reorganize DB2 tablespaces and index files by not utilizing conventional sort techniques. Viewing access is allowed during the reorganization process by setting the files to read only status. The process is basically non-destructive, allowing a prompt return to the original state, and is check-pointed, allowing restarting at selected intervals. Briefly, the original table and indices are considered as A files and read into memory. New row IDs or RIDs are developed using a non-sorting technique so that the proper order of the data is developed. After the new RIDs have been developed, both the clustering index and the row data are read out of memory and written to a new table and clustering index files in the proper order as B files. Then any remaining non-clustering indices are reorganized using non-sorting techniques in a similar fashion.

23 Claims, 27 Drawing Sheets

| LOGICAL | 1 | 2 | 3 | 4 | 5 | 6 | 7 | 8 | 9 | 10 | 11 |
|---|---|---|---|---|---|---|---|---|---|---|---|
| PHYSICAL | 8 | 10 | 3 | 6 | 11 | 4 | 7 | 14 | 15 | 12 | 13 |

| PHYSICAL | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| LOGICAL | 0 | 0 | 0 | 3 | 6 | 0 | 4 | 7 | 1 | 0 | 2 | 5 | 10 | 11 | 8 | 9 |

| MEMORY SPACE | PAGE |
|---|---|
|  | 15 |
|  | 14 |
|  | 13 |
|  | 12 |
|  | 11 |
|  | 10 |
|  | 9 |
|  | 8 |
| 7 | 7 |
| 4 | 6 |
|  | 5 |
| 6 | 4 |
| 3 | 3 |
|  | 2 |
| 8 | 1 |
                B

FIG. 11E

| MEMORY SPACE | PAGE |
|---|---|
|  | 15 |
|  | 14 |
|  | 13 |
|  | 12 |
|  | 11 |
|  | 10 |
|  | 9 |
|  | 8 |
| 7 | 7 |
| 4 | 6 |
|  | 5 |
| 6 | 4 |
| 3 | 3 |
| 10 | 2 |
| 8 | 1 |
                B

FIG. 11F

| MEMORY SPACE | PAGE |
|---|---|
|  | 15 |
|  | 14 |
|  | 13 |
|  | 12 |
|  | 11 |
|  | 10 |
|  | 9 |
|  | 8 |
| 7 | 7 |
| 4 | 6 |
| 11 | 5 |
| 6 | 4 |
| 3 | 3 |
| 10 | 2 |
| 8 | 1 |
                B

FIG. 11G

| MEMORY SPACE | PAGE |
|---|---|
|  | 15 |
|  | 14 |
|  | 13 |
|  | 12 |
|  | 11 |
| 12 | 10 |
|  | 9 |
|  | 8 |
| 7 | 7 |
| 4 | 6 |
| 11 | 5 |
| 6 | 4 |
| 3 | 3 |
| 10 | 2 |
| 8 | 1 |
                B

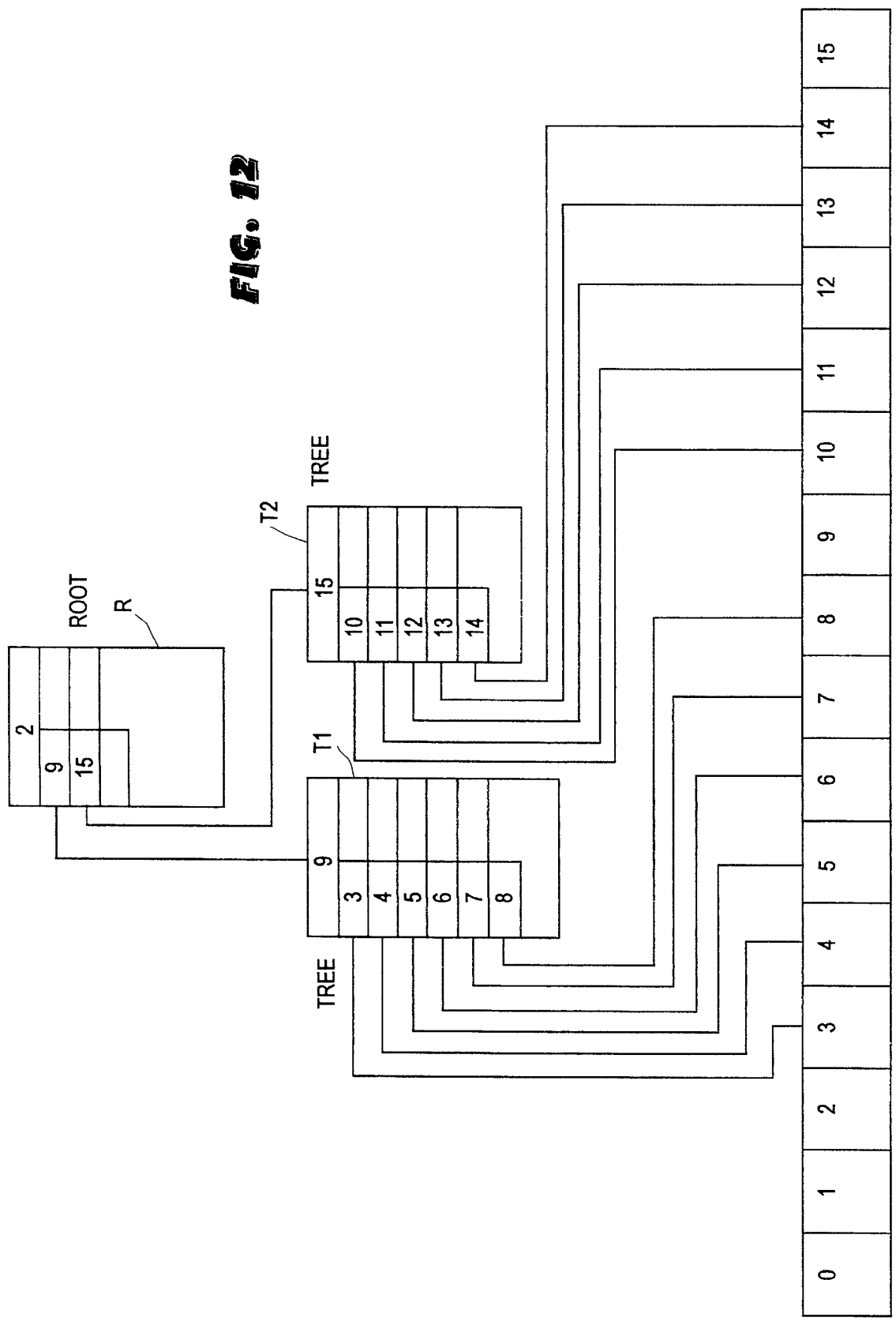

| PAGE | 0 | 1 | 2 | 3 | 4 | 5 |
|---|---|---|---|---|---|---|
| ROW 01 | HEADER | SPACE | A |  | C | D |
| ROW 02 |  | MAP |  |  | E | B |

FIG. 15A

| PAGE | 0 | 1 | 2 | 3 | 4 |
|---|---|---|---|---|---|
| ROW 01 | HEADER | SPACE | A | C | D |
| ROW 02 |  | MAP | B |  | E |

FIG. 15B

| KEY | RID |
|---|---|
| A | 201 |
| B | 502 |
| C | 401 |
| D | 501 |
| E | 402 |

FIG. 16A

| KEY | RID |
|---|---|
| A | 201 |
| B | 202 |
| C | 301 |
| D | 401 |
| E | 402 |

FIG. 16B

| OLD RID | LENGTH |
|---|---|
| 201 | 100 |
| 401 | 300 |
| 402 | 200 |
| 501 | 200 |
| 502 | 200 |

ILLUS. ONLY     TSRID3

FIG. 20A

| OLD RID | LENGTH |
|---|---|
| 201 | 201* |
| 401 | 202* |
| 402 | 301* |
| 501 | 200 |
| 502 | 200 |

ILLUS. ONLY     TSRID3

FIG. 20B

| KEY | RID |
|---|---|
| A | 201 |
| B | 502 |
| C | 401 |
| D | 501 |
| E | 402 |

CLIX

| OLD RID | NEW RID |
|---|---|
| 201 | |
| 502 | |
| 401 | |
| 501 | |
| 402 | |

TSRID2

| LENGTH |
|---|
| 100 |
| 300 |
| 200 |
| 200 |
| 200 |

TSRID3

| KEY | RID |
|-----|-----|
| A | 201 |
| B | 502 |
| C | 401 |
| D | 501 |
| E | 402 |

CLIX

| OLD RID | NEW RID |
|---------|---------|
| 201 | 201 |
| 502 | 202 |
| 401 | 301 |
| 501 | |
| 402 | |

TSRID2

| LENGTH |
|--------|
| 201* |
| 301* |
| 200 |
| 200 |
| 202* |

TSRID3

FIG. 21C

| KEY | RID |
|-----|-----|
| A | 201 |
| B | 502 |
| C | 401 |
| D | 501 |
| E | 402 |

CLIX

| OLD RID | NEW RID |
|---------|---------|
| 201 | 201 |
| 502 | 202 |
| 401 | 301 |
| 501 | 401 |
| 402 | 402 |

TSRID2

| LENGTH |
|--------|
| 201* |
| 301* |
| 402* |
| 401* |
| 202* |

TSRID3

5,517,641

1

RESTARTABLE METHOD TO REORGANIZE DB2 TABLESPACE RECORDS BY DETERMINING NEW PHYSICAL POSITIONS FOR THE RECORDS PRIOR TO MOVING USING A NON SORTING TECHNIC

SPECIFICATION

This is a continuation-in-part of application Ser. No. 07/889,454, filed May 27, 1992 now U.S. Pat. No. 5,408,654.

BACKGROUND OF THE INVENTION

1. Field of the Invention

The invention relates to reorganizing database data and index files, particularly DB2 tablespaces, into key order without utilizing conventional sorting procedures, while allowing the tablespaces to be viewed during reorganization and allowing prompt recovery or restarting of the process if interrupted before completion.

2. Description of the Related Art

Databases are used on computers for a myriad of reasons. In many cases the databases are extremely large, having entries in the millions. When databases reach this size, and the information is needed in a transactional or real time basis, mainframe computers are utilized. International Business Machines Corp. (IBM) has developed a database environment referred to as DB2 for use on its mainframes. Given IBM's high market percentage in mainframes, DB2 is clearly the leading database system.

A tablespace is the DB2 term used to identify a database. Tablespaces can be simple, segmented or partitioned. In a simple tablespace, the data is kept in one file and there may be a clustering index and other indices. A clustering index is the index where the keys are kept in sequential order and the data is preferably kept in this same order. In a segmented tablespace, many different logical data files or tables are kept in a single file and there may be a clustering index and other indices for each logical data file. There are no indices directed to multiple logical files. In a partitioned tablespace, the data is kept in different files, but there is a clustering index for each file. There may be additional indices directed to all of the partitions.

DB2 uses a balanced tree index structure. In this structure, root, tree and leaf pages are used, with each page at each level containing the same number of entries, except of course the last one. The leaf pages are the lowest level and each contains a number of entries referring to the actual data records contained in the DB2 data tables. Each leaf page is maintained in internal logical order automatically by DB2. Tree pages are the next level up, and are used to indicate the logical order of the leaf pages. For large databases, there may be many several layers of tree pages, a higher level of tree pages referencing a lower level of tree pages. Ultimately the number of tree pages is reduced such that all the entries or references fit into a single page referred to as the root page. As in leaf pages, within each tree or root page the entries are kept in logical order by DB2.

The data tables or files are organized into pages. The first page of each table is a header page. The second page and certain pages thereafter are referred to as space map pages. The header page contains information relating to the entire table while the space map pages include information relevant to free space in a following number of data pages. The actual frequency of the space map pages is based on

2 tablespace characteristics and is well known. The remaining pages are data pages. Up to 255 rows or records of data may be present in a single page. The actual number of rows depends on the size of the row and the size of the page. Each row receives a unique identifier, referred to as the RID, which identifies the page number and relative row number in that page.

One problem with any database is that the physical location of the various pages often becomes quite scattered. This is true for the data pages in the tables and the leaf pages in the indices. A disorganization also develops between the clustering index and the data, so that the table data is no longer physically in its intended logical order. This scattering results in reduced performance as now the storage device must move between widely scattered physical locations if logically sequential operations are to be performed. This is true of whatever type of Direct Access Storage Device (DASD) is used to store the file. Therefore the files need to be reorganized periodically so that the logical and physical ordering of the pages better correspond, thereby improving performance of operations.

IBM provides utilities with DB2 to reorganize the entire tablespace and just the index files. Several other third-party DB2 utility providers also have tablespace and index reorganization packages. These packages usually operate in the same manner. First, the entire file, either tablespace or index, is read in physical order. Each page in the file is then separated into its component record entries. Next, the record entries are sorted by key value using a conventional sort package. Finally, the sorted records are rewritten back into the file. While this process may sound simple, it must be understood that quite often there are hundreds of thousands to millions of entries in the file. When this number of entries is considered, then the process becomes quite time consuming, particularly the sorting step. The third party packages are faster than IBM's utility, but primarily because the sort packages used are more efficient and also because they use standard available sort package facilities, such as sort exits to reduce intermediate file I/O. So even in those cases the process is quite tedious and is done less frequently than desirable, so overall database performance suffers. Therefore it is desirable to have a significantly faster DB2 table and index reorganization method, so that the tables and indices can be reorganized more frequently and overall operations made more efficient.

Additionally, because the reorganization procedures often take large amounts of time, it would be desirable to access the files for viewing purposes, if not for updating purposes, during the reorganization. Further, should for some reason the process be stopped before completion, it would be desirable to have several alternatives to become fully operational without redoing the entire process.

SUMMARY OF THE INVENTION

The present invention relates to an improved method to dramatically reduce the time required to reorganize tablespaces and index files, particularly those as used by DB2. Additionally, the operations allow viewing access during the reorganization process; are non-destructive, allowing a prompt return to the original state; and are checkpointed, allowing restarting at selected intervals to avoid having to completely restart the process.

Briefly, the process is started by flushing any pending operations and setting all of the files in the tablespace to read only status. By using read only status, viewing access is allowed during the reorganization process. The first clustering index of the tablespace is then determined and the tablespace reordering and clustering index reorganization sequence is started. The original table and indices are considered as A files and read into memory. New row IDs or RIDs are developed as described below so that the order of the data is developed. After the new RIDs have been developed, both the clustering index and the row data are read out of memory and written to a new table and clustering index files in the proper order as B files. After the completion of writing the B files, checkpoints are placed to indicate sequencing of events.

If the tablespace is partitioned and there are any certain non-clustering, non-partitioned indices, then a series of AMS statements are developed and executed which rename all of these A or original files to C or temporary files as soon as the first reorganization of any single partition is completed. This is done as the indices will now be unusable because the references will no longer be correct. These AMS statements are then executed and checkpointed. Next, all files which need to be renamed are determined and written to a list. All of the table files are then stopped to allow exclusive access. Next, a series of AMS statements are built to do the renaming operations. Specifically, a series of statements are built to rename all of the A or original files to X or old files. Then a series of statements are developed renaming all B or new files to A files. Finally, a series of statements are made deleting all of the X files, thus effectively completing the task. After these statements have been developed they are executed and after execution, all checkpoints for the partition are removed. If there are any more partitions remaining, then control returns to the tablespace reordering and clustering index reorganization sequence to proceed with the next partition. This loop continues until all partitions have been processed. Thus, by use of the original and new files, the original can remain in a read only state until the new file process is complete. This allows viewing during almost the entire reorganization process and the process can be returned to the original state if possible or can be restarted from approximately where it was halted.

If the tablespace is not partitioned or after all partitions have had their tables reordered and clustering indices reorganized, then any remaining non-clustering indices are reorganized. This sequence is described in detail in the detailed description. Simply, again the original files are read into memory and the new files as they are written out are written into B files. In this manner the original A or C files are always remaining until after the development of the new files. After the new files have been developed, the files are renamed as described above.

The restarting process reviews the various check points and presence of the various A, C, X or B files and based on the checkpoint status and the presence of the various files, properly proceeds from the interrupted portion onward.

The tables and clustering indices are reordered in a different manner then the non-clustering indices. The non-clustering indices will be described first.

As a first general operation, the logical order of the leaf pages is determined by accessing the index tree. A buffer is used to receive the physical page number of the leaf pages in logical order. This buffer is then transposed into a physical order buffer, with the logical order value associated with the physical order value. After this, a large buffer is set aside in memory to receive a copy of all the leaf pages in the index file. The index file is then read in a sequential operation. As each physical page is read, the transposed or physical order buffer is accessed to find the proper logical page. If a leaf page has just been read, it is then placed in the large buffer in its logical position. When the entire index file is read and the leaf pages written to the large buffer, the large buffer is in a reorganized logical order. These leaf pages are then sequentially written to the new or B index file, referencing a buffer containing a translation between the old and new RID values so that the new RID values are written into the index, with the tree pages interspersed as they are filled. When the write operations are completed, the B or new index file replaces the A or old index file as described above.

Preferably the writing of the B index file can occur concurrently with the filling of the large buffer. As the beginning of the buffer becomes filled, the beginning entries can be written to the new index file, so that the write process is effectively racing the read and fill processes. If the index is not badly scattered, the concurrence can further reduce the total required time of the reorganization process.

As noted, table and clustering index reorganization proceeds somewhat differently. If a simple tablespace, a segmented tablespace having just a single table or a partitioned tablespace, then the clustering index for the particular table or partition is first reorganized basically as discussed above. Then a second or TSRID2 buffer is set up in order of the new index that has columns for the old RID and the new RID values. As the data is read sequentially from clustering index buffer, the old RID value is written to the old RID column of the TSRID2 buffer and the row numbers are monitored to determine the maximum row number. Then another buffer, the TSRID1 buffer, is developed having a number of slots equal to the number of pages times the maximum row number. Finally, a table buffer is set up having an area to receive the actual data in a compressed format. The table data is then read into this table buffer in sequential order, skipping any empty pages and saving the data. The length for each row is transferred to the proper slot in the TSRID1 buffer. A pointer is then placed at the beginning of the TSRID2 buffer, which is then read sequentially to obtain the old RID value which is used to calculate a slot in the TSRID1 buffer, and the row length is obtained. If an overflow RID is indicated, the actual row length is obtained using the overflow RID value. With the row length obtained, new RID values can be sequentially assigned from the beginning of the table and placed in both the TSRID1 and TSRID2 buffers. Header and space map pages are developed as necessary in a separate area in the table buffer as the necessary information is available. This process is continues through the entire TSRID2 buffer. The TSRID1 data space is then written to a file and checkpointed for recovery or restart reasons. The clustering index as reorganized is then written to a B file, effectively using the writing steps defined above. Then the table B file is opened for sequential operations and the header page and first space map page are written. Then using the TSRID2 data space in sequential order as an ordering element, the old RID value is used to reference the actual page data from the table buffer, which is then written in this order, along with the new RID numbers as stored in the TSRID2 buffer. The space map pages are written as necessary. After this process has been completed, sequential access to the table B file is closed and completion of the table B write operation is indicated.

Segmented files proceed slightly differently, in that first a TSRID3 buffer having a column to receive the row length and two additional slots for each page is set up. The table buffer having areas for the row data and header and space map pages is also setup. Further, cell range lists are setup for each table. The table data is then read into the table buffer in physical order. Additionally, the row length is placed in the TSRID3 buffer at the same time, with the row count for each page being placed in the page slots. Additionally, the cell range lists are maintained for each separate table in the segmented tablespace. If there is no clustering index, reference is simply made to the cell range lists and the page lengths from the TSRID3 buffer, new RID values are assigned and replace the length value in the TSRID3 buffer, with space map pages being built as appropriate. The table data is then saved in a FIFO queue. This process is repeated for each table.

If the table has a clustering index, then the index is then reorganized as above, the TSRID2 buffer being filled to obtain the old and new RID values. Proceeding sequentially through the TSRID2 buffer, the page length is obtained from the TSRID3 data space, with new RID values then being assigned and placed in the TSRID2 buffer, with space map pages being developed as appropriate. Again the table is saved in a FIFO queue for writing. Finally, after this step is completed, the clustering index is written out, with translation of the RIDs occurring as described above. This process also repeats until all tables have been completed.

Once the last table is completed, the table B file is opened for sequential operation and the header and first space map pages are written. Then the row data is written out in sequential order using either the TSRID3 buffer, if it is not an indexed table, or using the TSRID2 buffer to determine the old RID and new RID numbers. After all the data values have been retrieved from memory and written to the table B files for all tables, sequential access is closed and a checkpoint is completed.

Therefore the reorganization is also performed without a conventional sorting process, greatly speeding up operations.

BRIEF DESCRIPTION OF THE DRAWINGS

A better understanding of the present invention can be obtained when the following detailed description of the preferred embodiment is considered in conjunction with the following drawings, in which:

FIG. 9 illustrates the organization of an exemplary buffer organized in logical order of leaf pages;

FIG. 10 illustrates the organization of the buffer of FIG. 9 in physical order;

FIGS. 11A–11K illustrate the filling of a large memory space buffer in logical order with leaf pages obtained in physical order;

FIG. 12 illustrates the linkages of the final DB2 index file of FIG. 8 after reorganization;

FIGS. 13A, 13B, 14A and 14B are flowcharts of sequences for reorganizing DB2 non-clustering indices;

FIGS. 15A and 15B are representations of a DB2 table before and after reorganization;

FIGS. 16A and 16B are representations of a clustering index buffer before and after reorganization;

FIGS. 20A and 20B are representations of various buffers used with the sequence of FIGS. 17A and 17C–E during reorganization; and FIGS. 21A, 21B and 21C are representations of various buffers used with the sequence of FIGS. 17A and 17C–E during and after reorganization.

DETAILED DESCRIPTION OF THE PREFERRED EMBODIMENT

Figure 1A:
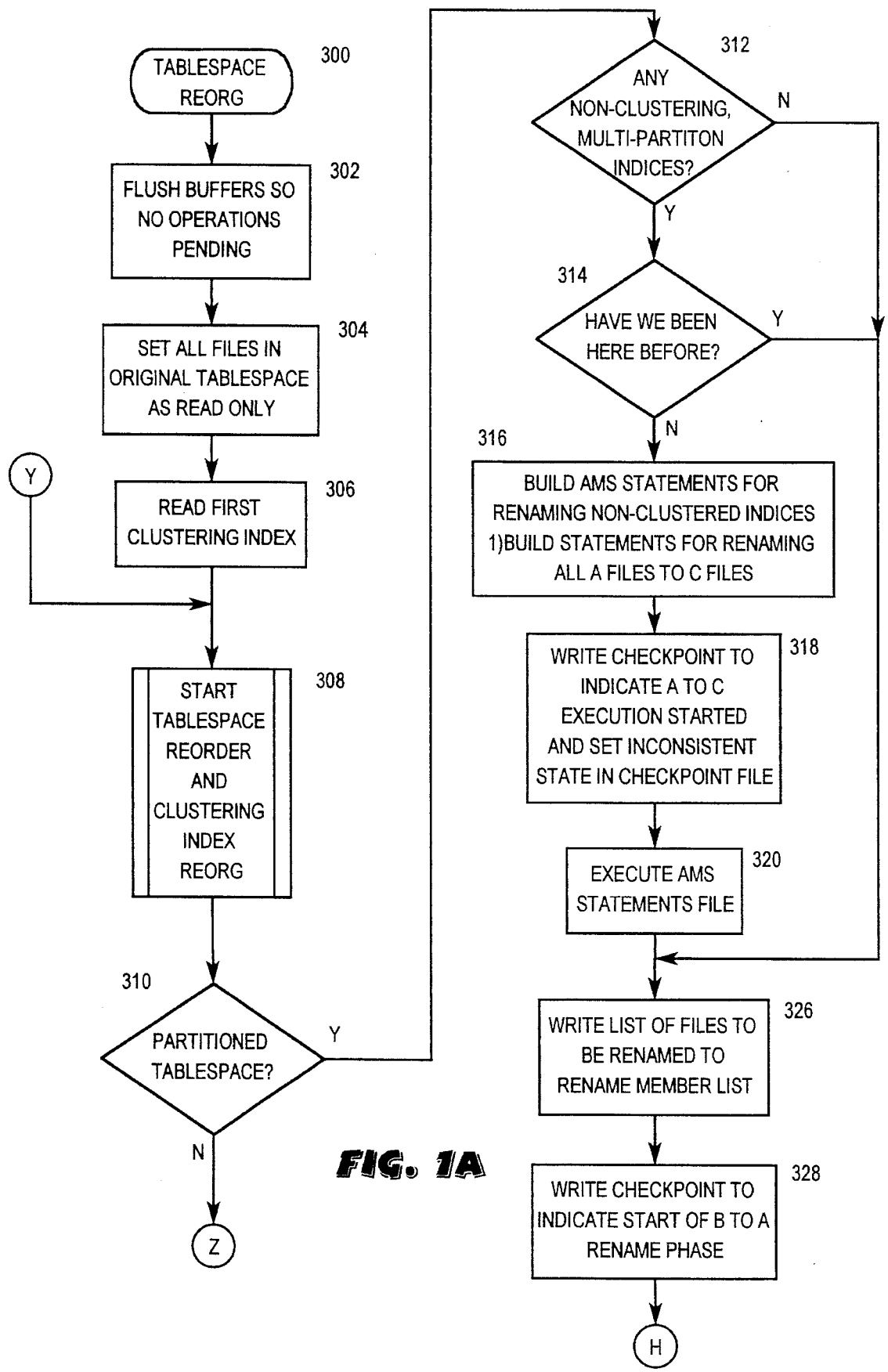
FIG. 1A and 1B are a flowchart of a DB2 tablespace reorganization procedure according to the present invention.
Figure 1B:
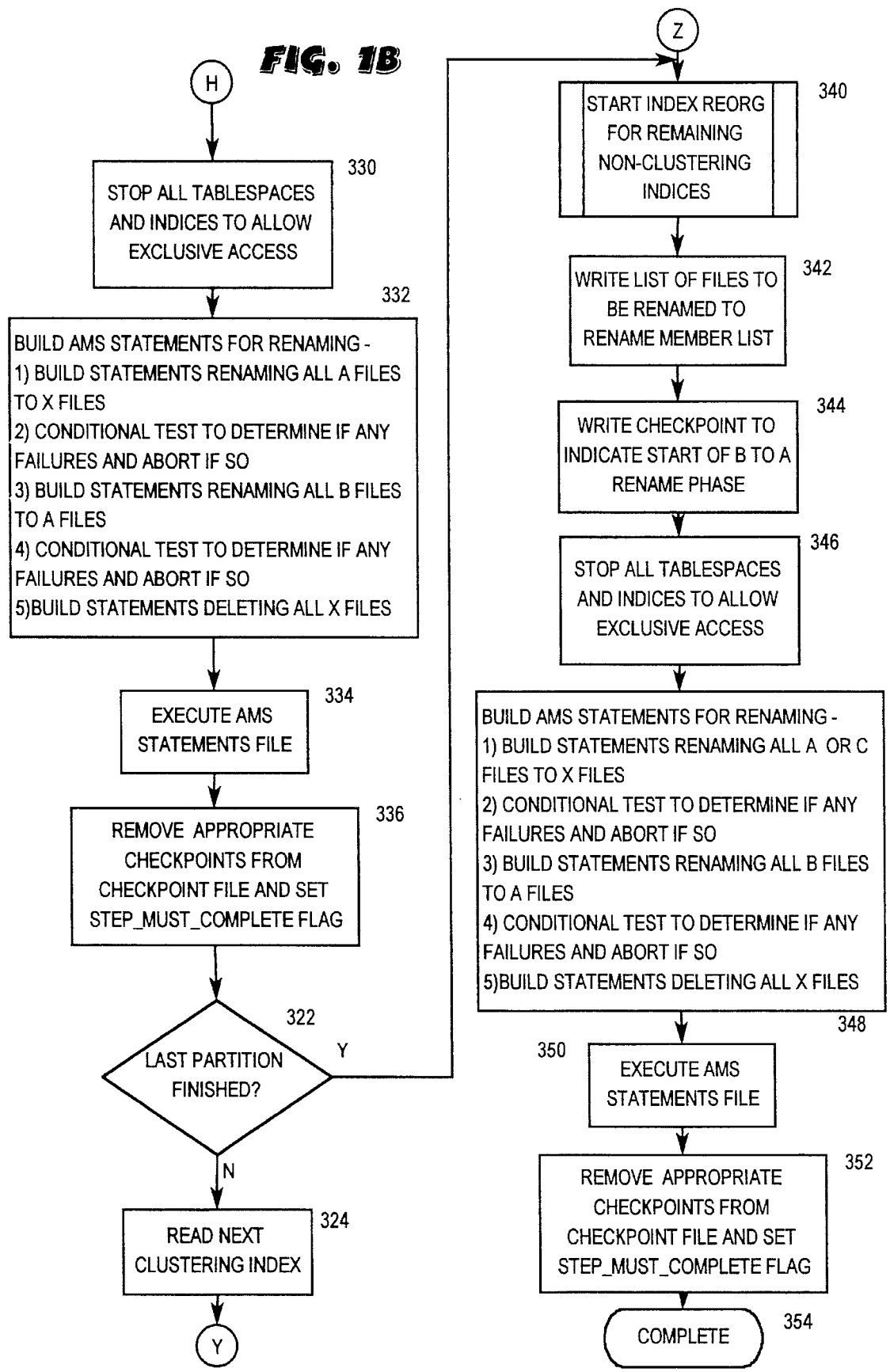

Referring now to FIGS. 1A and 1B, a tablespace reorganization sequence 300 according to the present invention is illustrated. The tablespace reorganization sequence 300 commences at step 302, where all the various buffers in the computer relating to the tablespace are flushed so that there are no pending operations, particularly write operations, to the tablespace. Control proceeds to step 304, where all of the files in the original tablespace are set as read only. This read only status allows viewing access to the tablespace but does not allow updates as that would interfere with the reorganization process. However, by making the tablespace read only, at least viewing rights are provided so that complete blocking of the tablespace is not necessary and some operations can be performed. Control then proceeds to step 306, where the first clustering index of the tablespace is read. There may be tablespaces where no clustering indexes are used, but that is a very simple case and is not addressed in this description. Control proceeds to step 308, where a tablespace reorder and clustering index reorganization sequence 400a, 400b is commenced. This sequence will be described in summary shortly below as sequence 400a and in great detail further below as sequence 400b.

After the sequence 400a, 400b has been started, control proceeds to step 310 to determine if this is a partitioned tablespace. If so, control proceeds step 312 to determine if there are any non-clustering, multi-partition indices, that is, any indices directed not to a single partition but rather to all of the partitions. If so, control proceeds to step 314 to determine if this branch has been previously taken. If not, control proceeds to step 316, where a series of AMS statements for renaming the indices are built. Specifically, the indices are to be renamed from what are referred to as the A or original files to C or temporary files. This must be done at this time because after the first table reorder is commenced, the non-clustering, multi-partition indices will no longer be proper and therefore can not be utilized, even for just view access. After the AMS statements have been built, control proceeds to step 318 where a checkpoint is written to a checkpoint file to indicate that the A to C rename execution has started. An INCONSISTENT STATE flag is also set in the checkpoint file for later use. Control then proceeds to step 320, where the AMS statements are started.

Control proceeds from step 320 or from step 312 if there are no non-clustering, multi-partition indices or step 314 if the process has previously been performed, to step 326, where a list of files relating to the particular partition or table is written to a file referred to as the rename member list. This is the list of files relating to the particular table, such as the clustering index and other partition or segment indices, that need to be renamed as part of the process. Control proceeds to step 328 where a checkpoint is written to indicate starting of the renaming phase. Control proceeds to step 330, where all of the tables and indices are stopped so that exclusive access is granted for the renaming steps. This is necessary because when renaming is operating, even viewing access must be disabled. However, the steps are relative quick and therefore this is not considered to a major burden, with view access provided for the predominant portion of the entire process. Control proceeds to step 332, where a series of AMS statements are built. The first series of statements renames all of the A files, i.e. the original files, to X files. Then there are a series of AMS statements relating to conditional testing to determine if there were any failures during the renaming operation of A to X. If so, the tests cause aborting of the operation. The next series of statements that are built relate to renaming all of the B files, i.e. all of the newly created files developed by the reordering and reorganization sequences, to A files. i.e. to the names of the original files. Next is a series of conditional test statements to determine if there were any failures during the proceeding renaming operations and causing aborting if so. The final series of AMS statements built are those that delete of all X files.

Control then proceeds to step 334 where the AMS statement file is started. During operation of the process started at step 334 all of the original files will have been named to temporary X files, all of the new files will be named to the A files and then all of the temporary X files will be deleted. By the completion of the process, all of the original files will be completely replaced with all of the new, reordered sequential files. Control then proceeds to step 336, where the appropriate checkpoints are removed from the checkpoint file so that should operations have to be restarted, as described below, there is no indication that this process is not fully completed. Further, a flag called the STEP__MUST__COMPLETE flag is set in the checkpoint file, as once the process of step 334 has started, all of the operations must complete. Control then proceeds to step 322 to determine if the last partition has been finished. If not, then control proceeds to step 324, where the next clustering index for the tablespace is read. Control then proceeds to step 308 where the tablespace reorder and clustering index reorganization is started for that particular partition.

If this was not a partitioned tablespace as determined in step 310 or the last partition had been finished as determined in step 322, control proceeds to step 340. In step 340 the index reorganization sequence 100 is started for each of the remaining non-clustering indices, including any non-clustering, multi-partition indices. Control then proceeds to step 342 where the checkpoint file is read to determine the files that have to be renamed and these are placed in a rename member list for each index. Control proceeds to step 344, where starting of the renaming phase is written to the checkpoint file to allow later restarting. Control proceeds to step 346, where all of the tables and indices are stopped to allow exclusive access. Control proceeds to step 348, where a series of AMS statements similar to those in step 332 are developed. Control proceeds to step 350, where the AMS statements built in step 348 are started. Control then proceeds to step 352, where once again the checkpoints are removed from the checkpoint file and the STEP__MUST__COMPLETE flag is set. Control then proceeds to step 354, which indicates that the task is completed.

Figure 2:
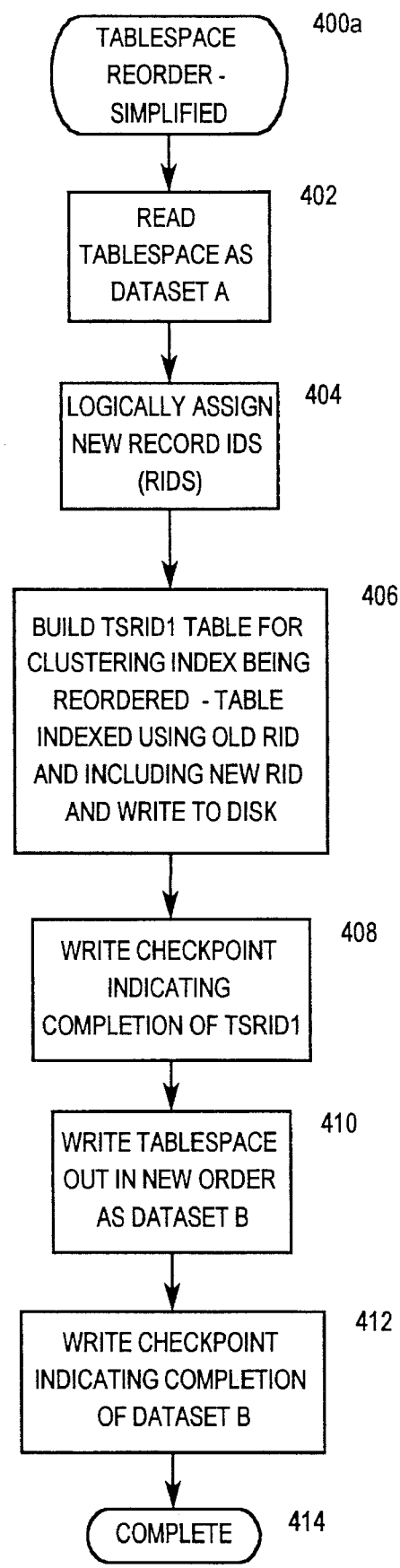
FIG. 2 is a flowchart of the tablespace reorder sequence simplified of FIG. 1A.

A simplified version of the table reorder sequence 400*a* is shown in FIG. 2. A simplified version is used here for illustrative purposes, with more detail provided below in the description of sequence 400*b*. In step 402 the tablespace, that is the data, is defined to be data set A and is read into the memory of the computer. There are various steps in step 404 which then logically assign new record IDs or RIDs to each of the rows of the tablespace data which have been read. In step 406 in this simplified format a table referred to as TSRID1 buffer for the clustering index which is being reordered is built. This is a table which is in indexed order and will include the new RID value for each row of data. When the buffer has been completed, it is written to disk for later use. Control proceeds to step 408, where a checkpoint is written, indicating completion of the TSRID1 buffer development operation. After this is done, the tablespace data is written out in step 410 in its new order as data set B. Control then proceeds to step 412 where a checkpoint is written to indicate completion of the data set B operation. Step 412 is a return or complete operation. The various steps of this sequence 400*a* are actually more detailed but are provided in this simplified version to show that the original data space is read in from the original or A file and is written out as a new B data set to allow the restarting operations as will be described below.

Figure 3A:
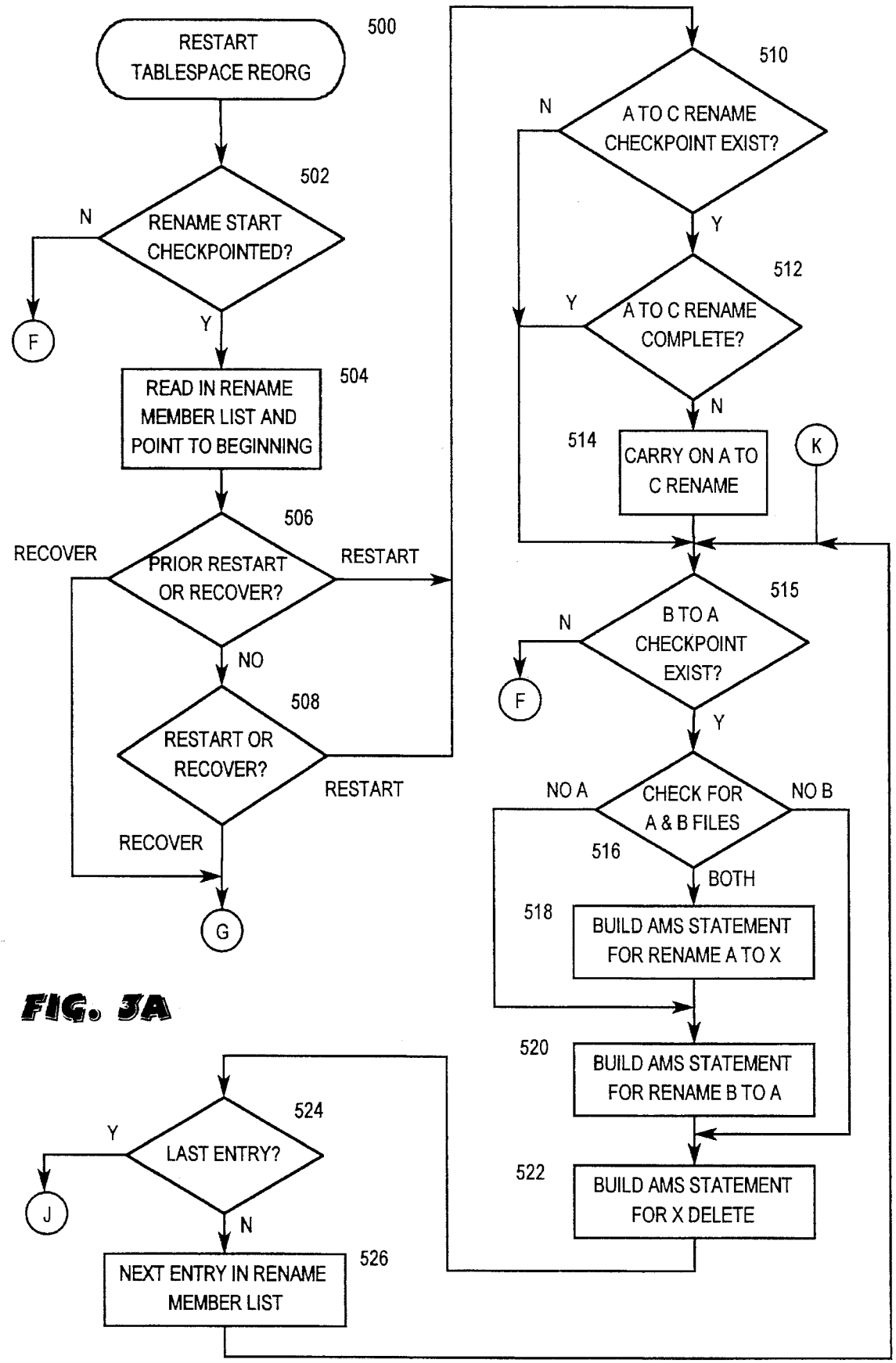
FIGS. 3A, 3B and 3C are a flowchart of a restart sequence according to the present invention.
Figure 3B:
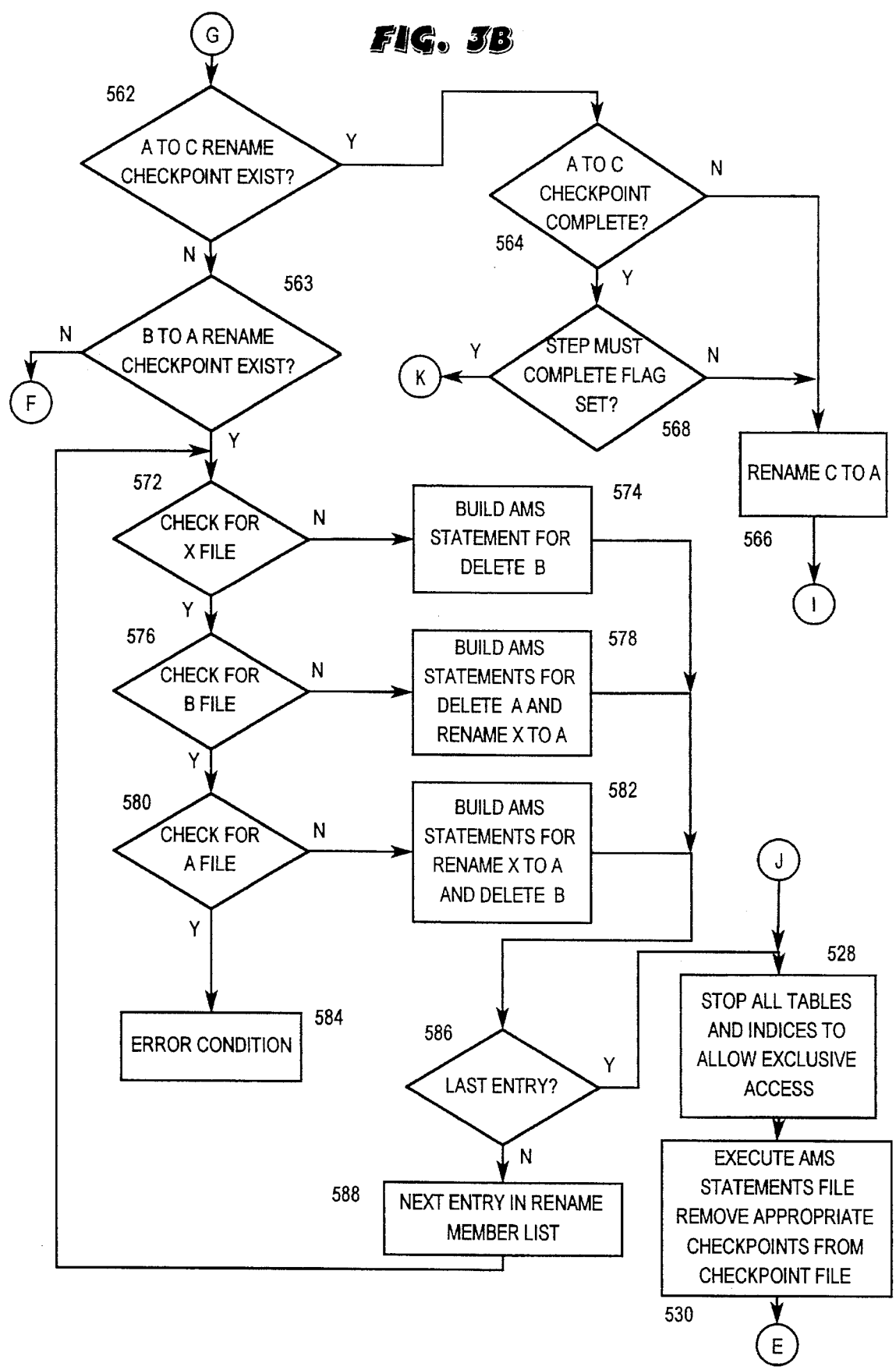
Figure 3C:
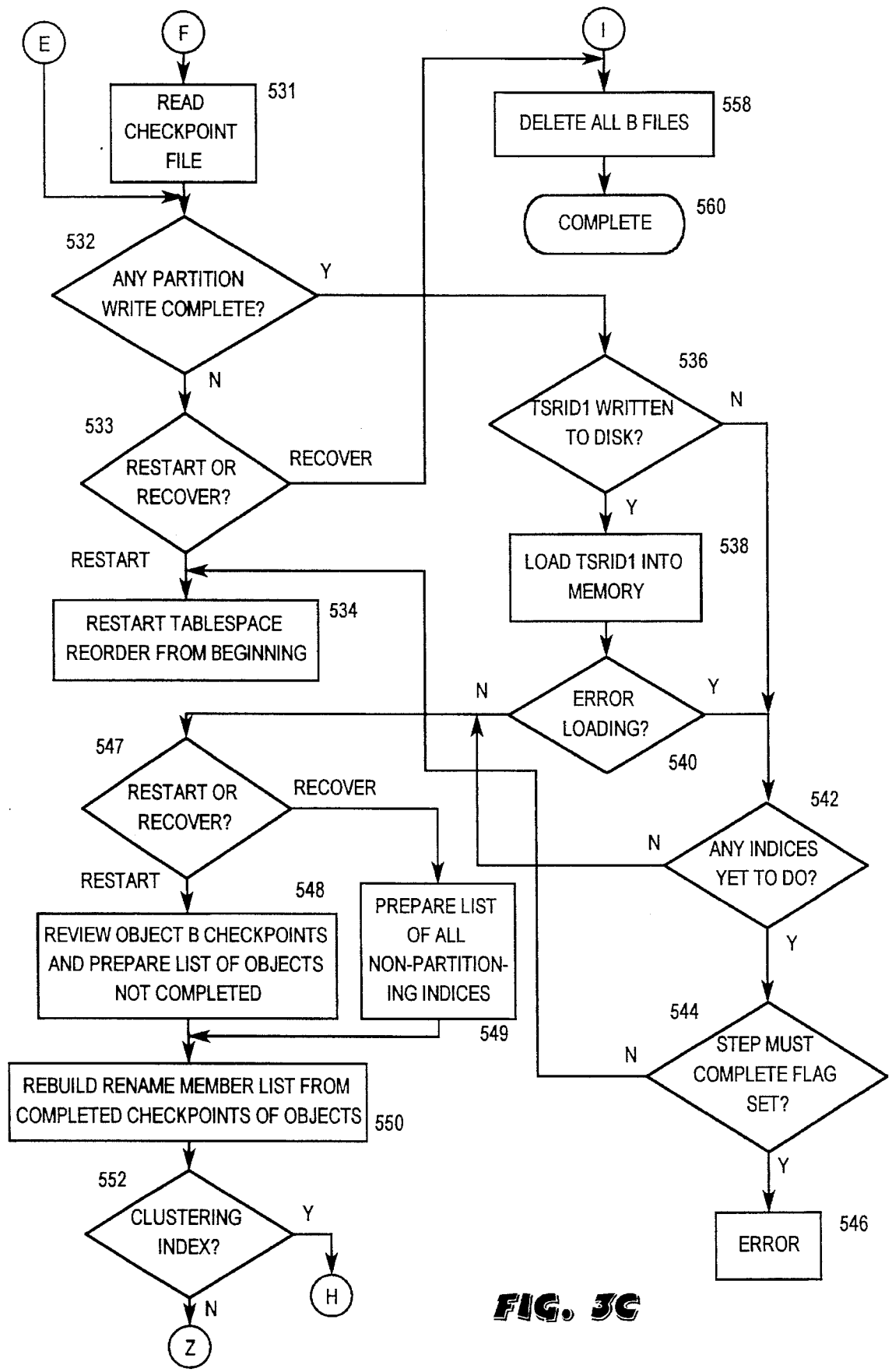

The restart tablespace reorg sequence 500 is shown in FIGS. 3A, 3B and 3C. The sequence 500 is utilized in case the tablespace reorganization operations do not complete once they have been started. This is not an unusual event because of the great length and complexity of the various tablespaces. Because of the millions of records which may be in a tablespace, even given the speed of the technique according to the present invention, it still a multi-hour process in many cases and thus numerous events can occur which could cause the sequences to stop prior to completion. Once operation has stopped before completion, it is desirable to be able to go back and restart the process, either by recovering and going back as quickly as possible to operational status or by restarting the process from approximately the failure point so that prior efforts do not have to be completely duplicated.

The sequence 500 commences operation at step 502 to determine if the rename sequence for each of the indices had been started. This is done by reviewing the checkpoint file. As noted above, once a particular index or table has been finished, the checkpoints are deleted from the checkpoint file so that only tables or indices which are interrupted during execution will have checkpoint entries. If the rename start has been checkpointed, control proceeds to step 504, where the rename member list is read and a pointer set to the beginning. Control then proceeds to step 506 to determine if there had been a prior restart or recover. Again it is quite possible that the restart procedure itself could be terminated abnormally, which may result in different operations upon a second or repetitive restart. If there was no prior restart or recover, control proceeds to step 508 to determine if the restart or the recover option has been selected. Generally a recover operation is one deemed to request getting the system fully operational as quickly as possible, while a restart operation is one requesting to restart the terminated operation and complete the reorganization.

If a prior restart was indicated in step 506 or a restart was indicated in step 508, control proceeds to step 510 to determine if the A to C rename checkpoint exists. If so, control proceeds to step 512 to determine if the A to C renaming process had completed. If not, control proceeds to step 514 where the A to C renaming process is continued to completion. If the A to C rename checkpoint did not exist in step 510, the rename was complete in step 512 or after step 514, control proceeds to step 515 to determine if the B to A rename checkpoint exists. If not, control proceeds to step 531. If so, control proceeds to step 516 to check for the presence of A and B files. As will be recalled, the A files are the original files and the B files are the newly completed reorganized files. If both exist, control proceeds to step 518, where AMS statements are built to rename the particular A files to X files. Control then proceeds to step 520, which is also where control proceeds if no A files are found. In step 520 AMS statements are built to rename the particular B files which are present to A files. Control then proceeds to step 522, which is also where control proceeds if there were no B files as determined in step 516. In step 522 AMS statements are built to delete all of the X files are present. Control then proceeds to step 524 to determine if this was the last entry in the particular rename member list. If not, control proceeds to step 526 where the next entry in the rename member list is reviewed and control returns to step 516 to complete this process.

If this was the last entry in the rename member list, control proceeds to step 528 where all of the table and indices are stopped to allow exclusive access. Control then proceeds to step 530 where the AMS statements are executed and the appropriate checkpoints are removed from the checkpoint file. Control then proceeds to step 532 to determine if any partition or tablespace has been completed. If not, control proceeds to step 533 to determine if a restart or recover operation is in process. If a recover, control proceeds to step 558. If a restart, control proceeds to step 534 where the tablespace reorganization procedure must be restarted from the beginning. If the partition write was complete, control proceeds to step 536 to determine if the TSRID1 buffer had been written to disk, indicating a certain level of completion of the index and table operations. If so, the TSRID1 buffer is reloaded into memory in step 538. In step 540, a test is made to determine if there was an error loading the TSRID1 file. If so, control proceeds to step 542, which is also where control proceeds if the TSRID1 file had not been written in step 536. In step 542 a determination is made whether any indices are yet to be completed and there are further yet to do. If so, control proceeds to step 544 to determine if the STEP_MUST_COMPLETE flag is set. If so, control proceeds to step 546 as this is an error condition. If not, control proceeds to step 534 where the tablespace reorganization is restarted.

If there was no error in loading the file in step 540 or there were no indices yet to do in step 542, control proceeds to step 547 to determine if a restart or recover operation is in progress. If a restart, control proceeds to step 548, where the object checkpoints, table or index as the case may be, are reviewed and a list of objects not yet completed is developed. If a recover in step 547, control proceeds to step 549 where the list is developed only of all non-partitioned indices. Control proceeds from steps 548 and 549 to step 550, where a rename member list is rebuilt from the completed checkpoints. Control then proceeds to step 552 to determine if there is a clustering index. If not, control proceeds to step 340 in the tablespace reorganization sequence 300 to complete the operations. If there is a clustering index, control proceeds to step 326 where the clustering index operations are performed.

If in step 502 it was determined that the rename start had not been checkpointed, control proceeds to step control proceeds to step 531. In step 531 the checkpoint file is read and then control proceeds to step 532.

If in steps 506 or 508 it was determined that recover was requested or previously done, control proceeds to step 562 to determine if the A to C rename checkpoint exists. If so, control proceeds to step 564 to determine if the A to C checkpoint completion has been indicated. If not, control proceeds to step 566 where the C files are renamed to A files and control then proceeds to step 558 to delete all of the B files. If the A to C renaming has been completed, control proceeds to step 568 to determine if the STEP_MUST_COMPLETE flag is set. If so, control proceeds to step 516 as a recover can only occur by completion of the reorganization process. If the STEP_MUST_COMPLETE flag was not set in step 568, control proceeds to step 566.

If the A to C checkpoint did not exist in step 562, control proceeds to step 563 to determine if the B to A checkpoint exists. If not, control proceeds to step 531. If so, control proceeds to step 572 to determine if there are any X files. If not, control proceeds to step 574 where AMS statements are built to delete the B files. If so, control proceeds to step 574 to determine if there are any B files. If not, control proceeds to step 578 where AMS statements are built to delete the A files and to rename the X files to A files. If there are B files, control process to step 580 to determine if there are any A files. If not, control proceeds to step 582 to develop a series of AMS statements to rename all of the X files to A files and to build AMS statements to delete all of the B files. If there are A files in step 580, control proceeds to step 584 as this is an error condition. After steps 574, 578 or 582, control proceeds to step 586 to determine if this was the last entry in the rename member list. If not, control proceeds to step 588 where the next entry is obtained and control returns to step 582. If it was the last entry control proceeds to step 528.

Various detailed reorganization and reordering sequences are utilized. Those will be explained at this time. First, the non-clustering index reorganization is explained to illustrate an exemplary reorganization procedure for the index, followed by the detailed operation of the table reordering and clustering reorganization process. It is noted that no conventional sort techniques are used, and basically only sequential access is used when reading or writing files, thus greatly improving speeds, both in file access and in reordering.

Figure 4:
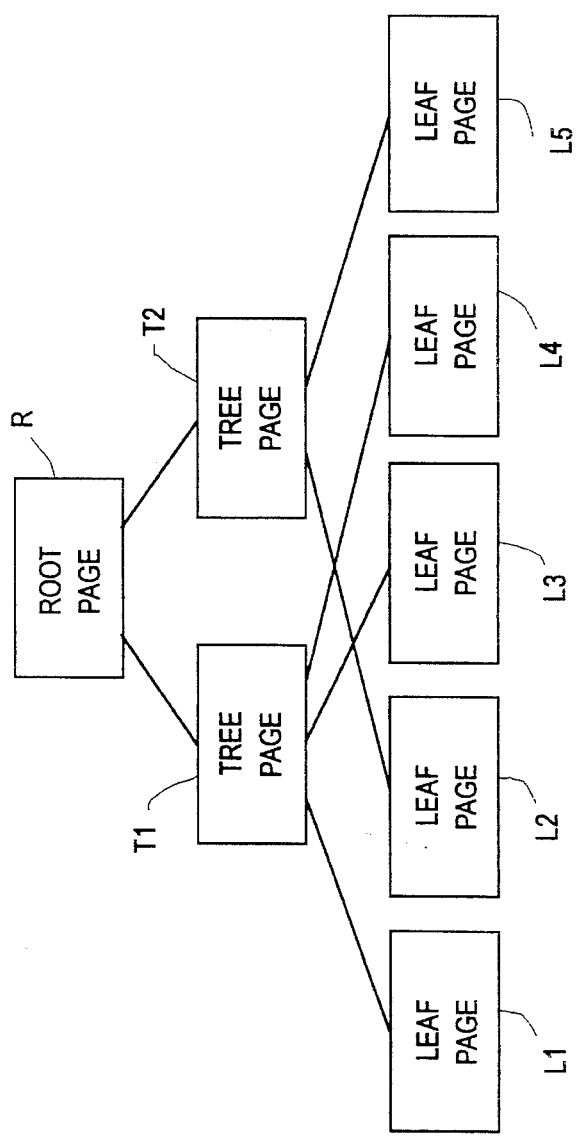
FIG. 4 is a representation of a balanced tree structure.

Referring now to FIG. 4, a balanced tree structure such as used in a DB2 index file is shown. A root page R is at the top of the tree and contains entries directing to the two tree pages T1 and T2. Each of the tree pages T1 and T2 contain a plurality of entries which point to various leaf pages L1–L5. Each leaf page then also finally contains a series of entries which directly point to the table space pages in the table with which the index is associated. It is understood that in a DB2 file the entries in each individual leaf page L1–L5 are kept in logical order by the DB2 system itself. Similarly, the entries in each of the tree pages T1 and T2 and the root page R are also similarly automatically kept ordered in logical order within the page itself.

Figure 5:
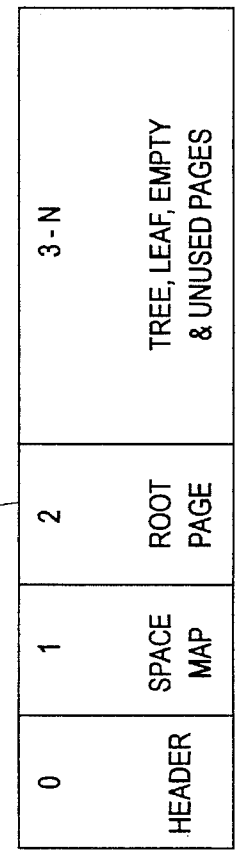
FIG. 5 is a representation of the page order of a DB2 index file.

FIG. 5 is a sequential representation of a DB2 index file, which is a VSAM data set in either ESDS or LDS format. It is understood that when various initials are utilized, these are considered well known to those skilled in the art of IBM mainframes and DB2 and thus the full acronym may not be provided. The index file, generally referred to by the letter I, in FIG. 5 has a first page 0 which is a header page. This header page contains particular information needed to indicate to the various packages and programs, most particularly to the operating system of the machine, the type of file and other related information. The second page of the index file I is a space map which indicates which particular subsequent pages in the file are currently active for that particular index file, these pages either being tree pages or leaf pages. The third page, page 2, is the root page R. The remaining pages in the index file I are tree, leaf, empty and unused pages in whatever order has developed through the use of the DB2 indexing process.

Figure 6:
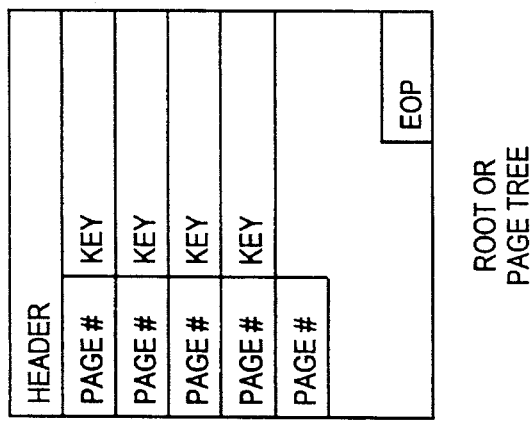
FIG. 6 is a representation of the structure of a root or tree page in a DB2 index file.

FIG. 6 illustrates the organization of information inside a particular root or tree page. The page starts with a header which contains various control information needed by DB2. Following this is a series of page number and key value entries, with the final entry being a single page number entry and the page concluding with an EOP or end of page indicator. For each of the series of page number and key value entries, the page number indicates the particular physical page which contains the next level down in the tree structure and the key value indicates the highest index key value contained in that particular page. The final page number in the particular root or tree page does not need a key value, as no further reference is necessary to higher key values. It is of course understood that if the index is sufficiently small, no tree pages are actually present and the root page can actually be a leaf page, but this is an unusual condition in that the database is then very small. A much more conventional structure, as indicated before, has multiple layers of tree pages between the root page and the leaf pages. If the particular structure of the index file had three levels, then the root page would indicate the appropriate number of references to specific tree pages, which tree pages would then also contain entries to another level of tree pages, which tree pages would then finally point to the leaf pages. It is also noted that for the examples in this specification show only a very limited number of entries in each page for simplicity. It is understood that in actual use a DB2 index file root or tree page will contain up to 1000 entries depending on the length of the key value, while the leaf files may contain up to 800 entries as described below, though normally a tree page has approximately 100 entries and a leaf page has approximately 70 entries.

Figure 7B:
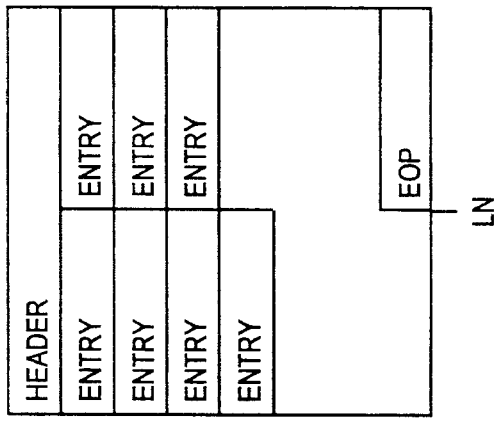
FIGS. 7A and 7B are representations of the structures of the leaf pages in a DB2 index file.
Figure 7A:
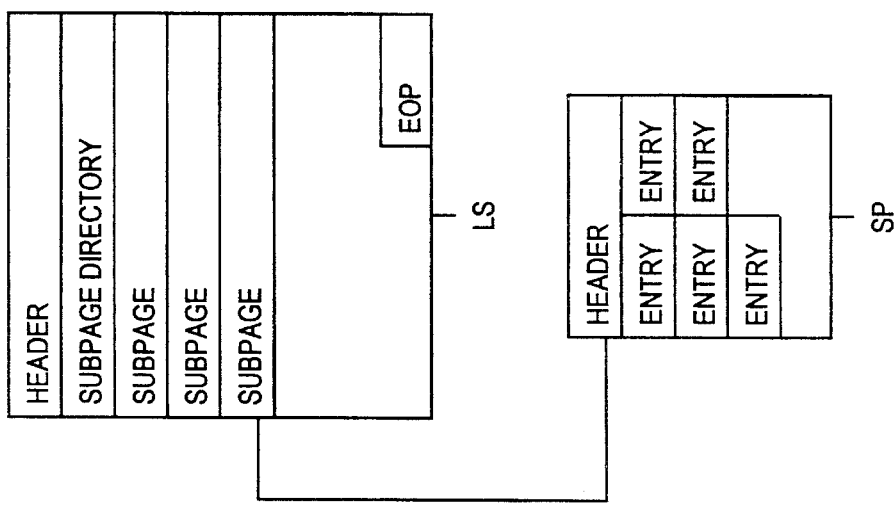

FIGS. 7A and 7B illustrate the two various arrangements of leaf pages allowable in a DB2 index file. In the version shown in FIG. 7A, referred to as a segmented leaf page LS, the page contains a header which contains control information, followed by a subpage directory, which is a series of offsets to the particular subpages contained in the particular page and to the various high key values. Then follows a series of subpages followed by an end of page indicator. Shown below the leaf page LS is a single subpage SP which also contains a header for control information and a plurality of entries which are the actual index values. It is understood that each of the subpages has the structure as in the subpage SP. FIG. 7B shows an alternative non-segmented leaf page LN. The non-segmented leaf page LN contains a header for the necessary control information and then simply a plurality of entries which are the index entries. Therefore FIGS. 6, 7A and 7B show the structure of the various page entries present in the index file I.

Figure 8:
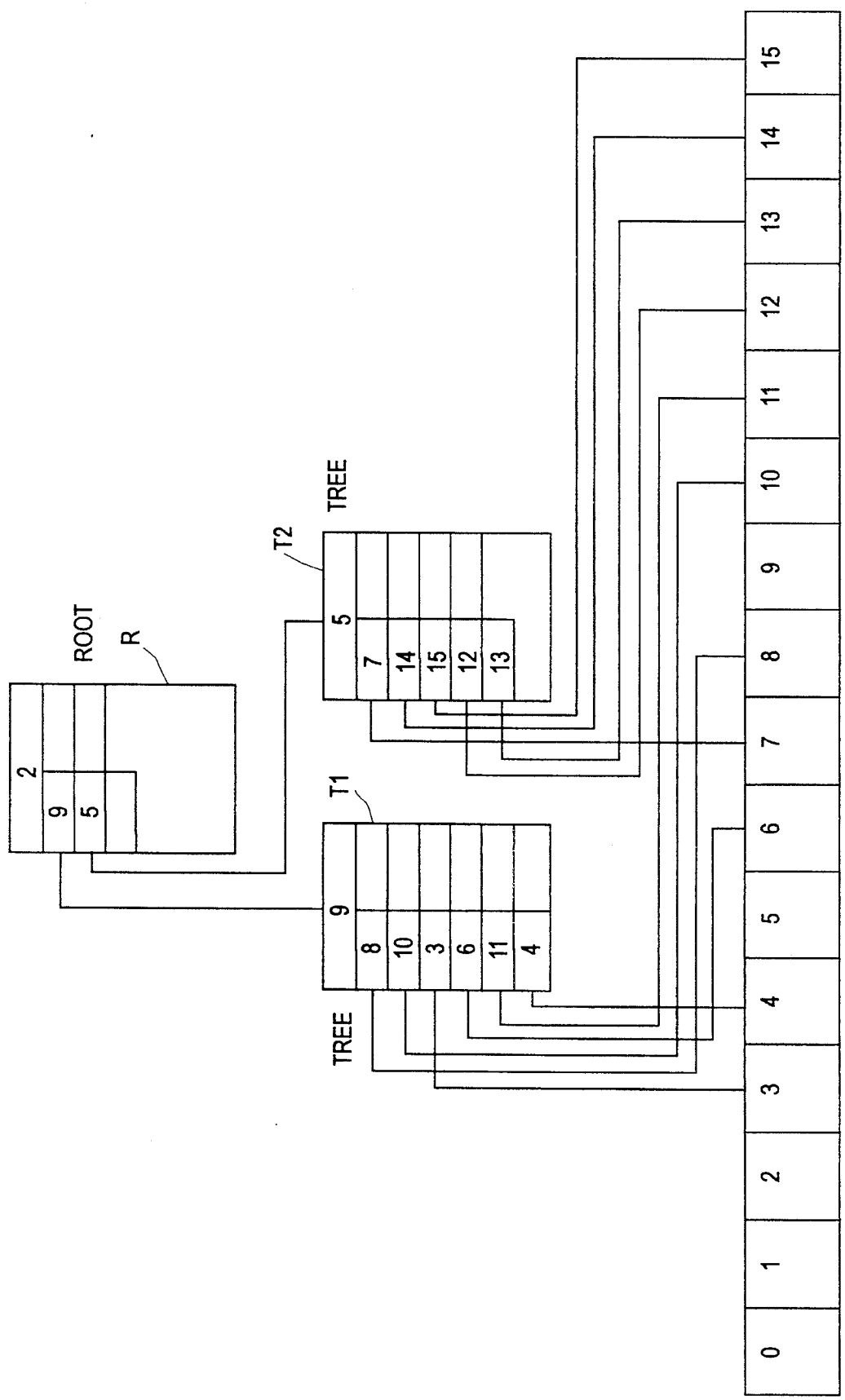
FIG. 8 illustrates the linkages in an exemplary DB2 index file tree structure.

FIG. 8 is an exemplary representation showing particular root and tree pages R, T1 and T2, wherein the particular physical page numbers have been illustrated. Again it is noted that this is a very simple example utilizing only 13 leaf pages, 2 tree pages and a single root page. Of course, in a typical index file there would be thousands to hundreds of thousands to millions of these particular pages. However, the particular example is used to indicate the method of the preferred embodiment in a much more clear and concise format. In the example of FIG. 8, the root page R is page 2 of the index file I as indicated. The first page number entry, i.e. the first logical tree page, is page 9. Proceeding then to the tree page at page 9, which is tree page T1, tree page T1 contains a series of page number entries. These page number entries are the particular leaf pages in logical order. The six entries in the particular tree page T1 are the physical number of the particular page of the leaf page, while the ordering is from first to last within the particular tree page T1. Similarly, the second tree page T2, which is physical page 5 in the example of FIG. 8, contains five leaf page entries contained in logical order. It can be seen that the physical order of the entries in both the tree pages T1 and T2 and the root page R do not bear any necessary physical relationship at this time. This often develops during use of a particular database in DB2 as items are deleted, rearranged, added and so forth. Looking at the structure of FIG. 8, it can be seen that if a direct access storage device (DASD) were to try and access the various leaf pages in logical order, then the device would be skipping from page 8 to page 10 to page 3 to page 6 and so on in the index file I. All of this random access movement is necessarily slower then the various sequential movements. For example, in the case of a disk drive unit the head would have to be moved to several different locations, i.e. there would be numerous seek requests across several tracks. This is one of the slower operations of a disk drive, so performance of the DB2 system would be reduced.

FIG. 9 shows the development of the first buffer, a logical order buffer LB, utilized in the preferred embodiment. The buffer LB is preferably has a length of the number of leaf pages, in the case of FIG. 9, 11 pages. This buffer LB contains the association of the logical relationship of a particular leaf page to its physical relationship. This is developed by scanning down from the root page R through the various tree pages T1 and T2 in the following sequence. Looking at the root page R, the entries in FIG. 8 indicate tree pages at physical pages 9 and 5. Proceeding to page 9, this is tree page T1, which then has entries 8, 10, 3, 6, 11 and 4. After processing of this tree page T1 has been completed, physical page 5, which is tree page T2, is processed. Tree page T2, has in logical order the leaf pages 7, 14, 15, 12, and 13. Referencing then physical page 8, a review indicates that page 8 and thus the pages on that level are leaf pages and we have reached the effective bottom of the tree. Therefore the particular buffer LB shown in FIG. 9 has a number 8 for the physical page of the logically first leaf page in the first position. The buffer LB then proceeds to contain 10, 3, 6, 11, 4, 7, 14, 15, 12, and 13 as that is the order indicated in the tree pages T1 and T2. These leaf page values are then entered into the buffer LB of FIG. 9 in order. Therefore the buffer LB contains in each effective logical position the physical page location of the particular leaf page having that logical ranking.

The buffer LB is shown transposed or converted into a physical buffer PB in FIG. 10. The physical buffer PB is preferably first cleared so that the various tree and root entries do not receive valid data values and then the logical buffer LB is transposed. The transposition of the logical buffer LB to the physical buffer PB is such that the logical buffer LB is scanned and the logical page value is placed into the physical page number location in the physical buffer PB. For instance, physical location 8 receives the value 1 to indicate that it is the first logical ordered leaf page. This process proceeds for all the entire leaf pages. It is noted that in FIG. 10 that there are various zeroes indicating empty entries in the physical buffer. These are the locations of the empty pages, the various system pages, the root page and the various tree pages. For example pages 2, 5 and 9 are the root and tree pages.

Figure 11A:
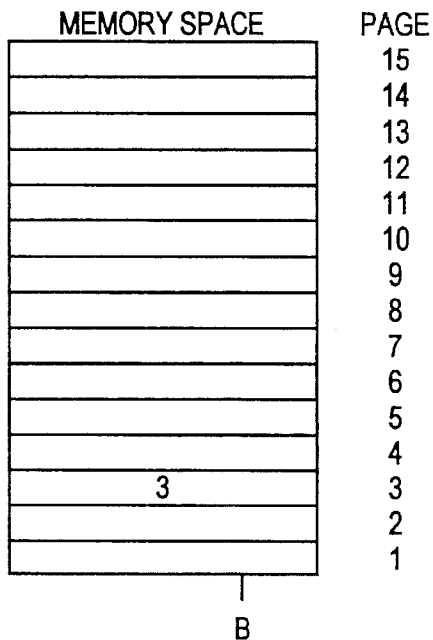

With this buffer PB then developed, a large buffer B is set aside in the memory space of the computer to receive the leaf page information. This large buffer set aside in the memory space has a number of pages equal to the number of leaf pages which are contained in the index file I. In the example, 15 leaf pages are shown in FIG. 11A when in actuality only 11 are necessary for the index file I of FIG. 8. With the physical buffer PB developed, the index file I is then read sequentially. Sequential operations are preferred as this the fastest operation for the DASD device. As the index file I is read sequentially, the particular physical page number of each leaf page is compared against the logical value as indicated by the physical buffer PB. If the value is 0, the not defined value, then this is an empty page, a system page, a root page or a tree page and is not to be entered into the large buffer B. In the given example of the physical buffer PB in FIG. 10, the first valid entry is physical page 3, which is also logical page 3. This particular leaf page is then written into page 3 of the large buffer B. Therefore physical page 3 has been written into what is logical page 3 of the large buffer B, as shown in FIG. 11A.

Figure 11B:
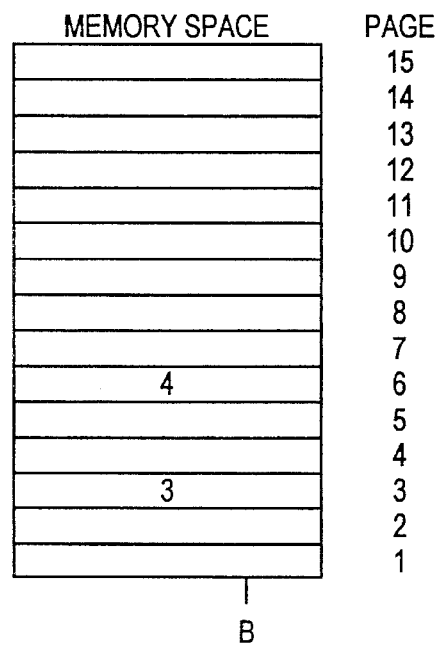
Figure 11C:
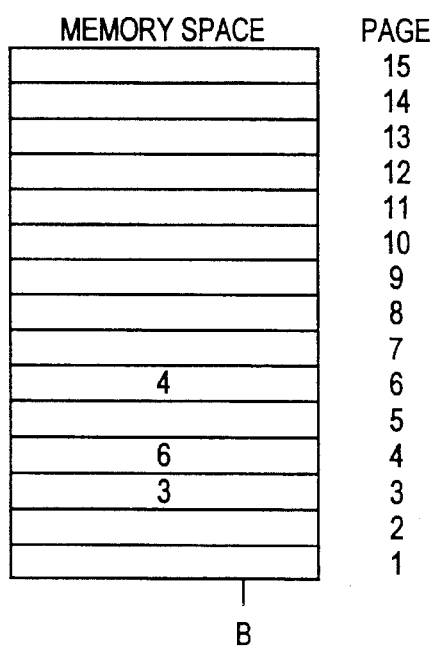
Figure 11D:
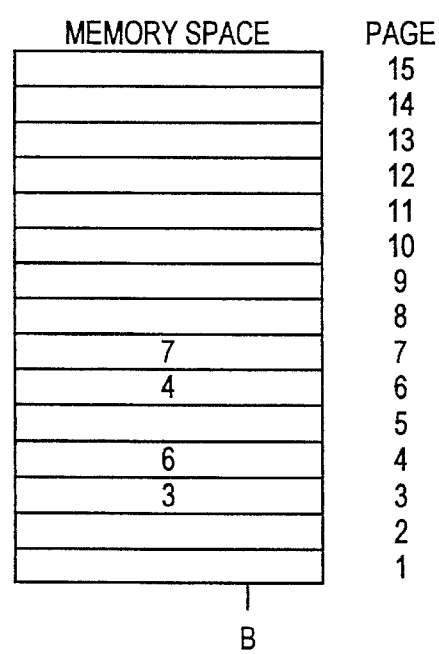
Figure 11I:
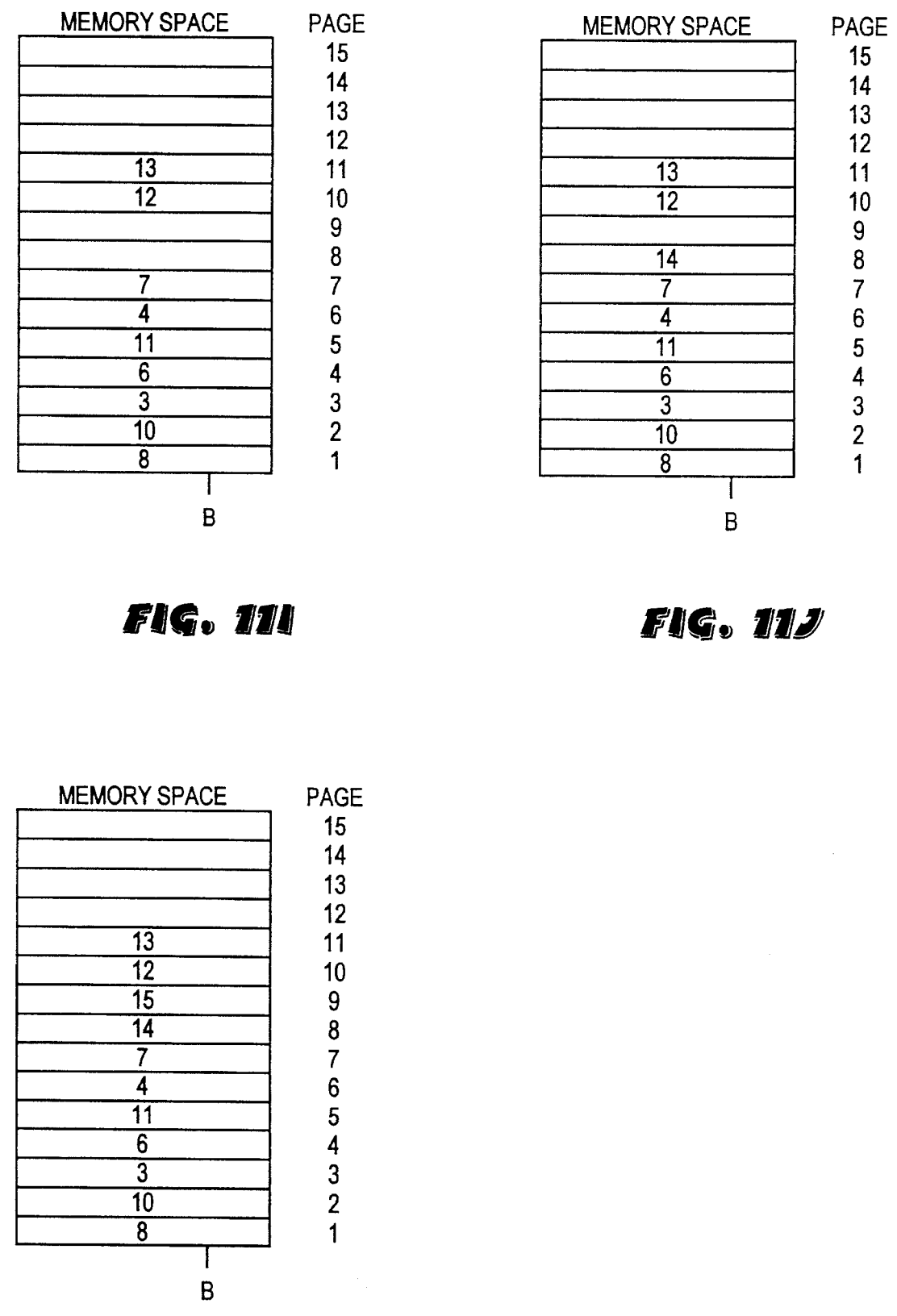
Figure 13A:
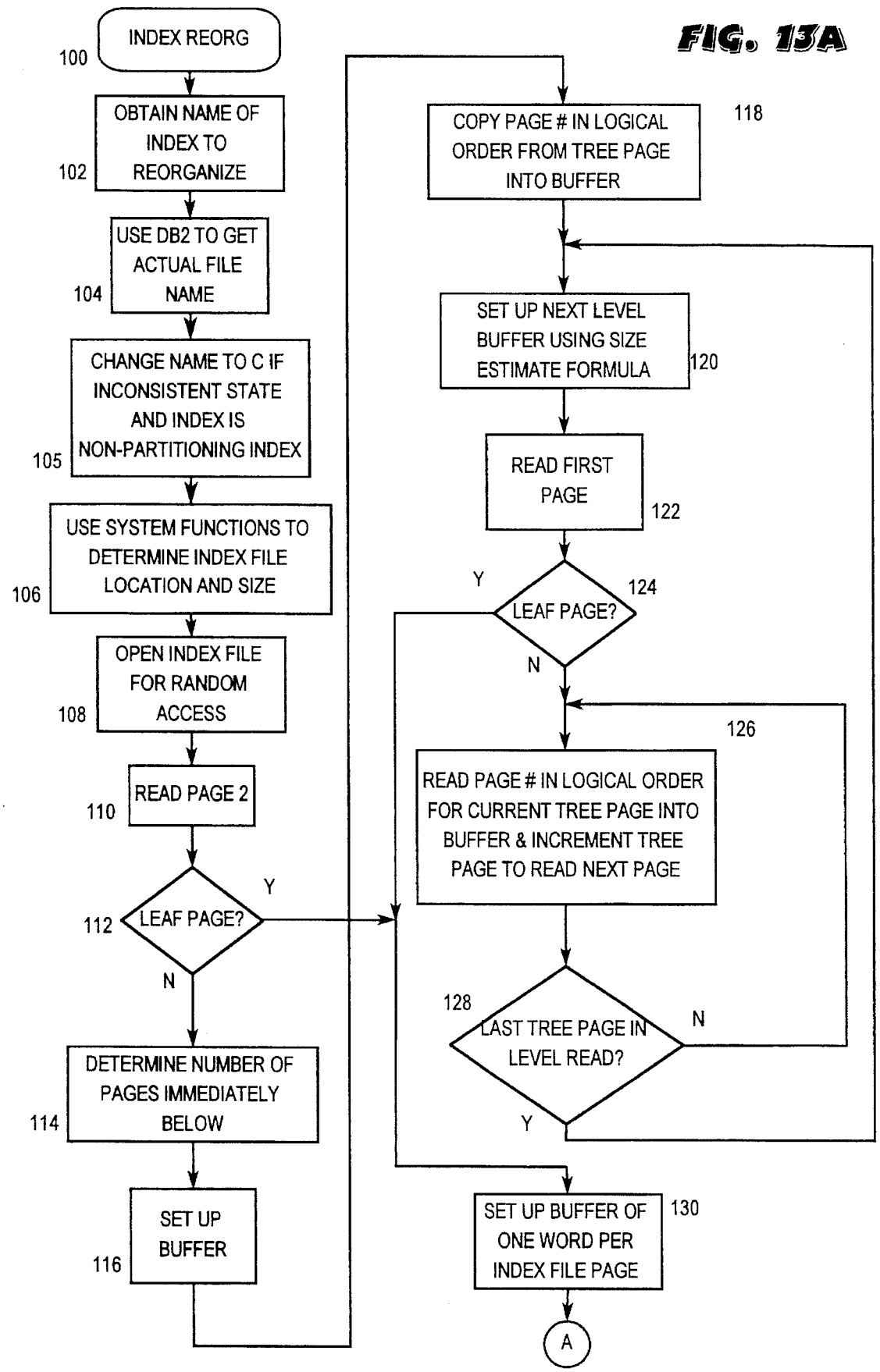

Proceeding, the next value read is physical page 4, which is logical page 6. Thus the leaf page 4 is placed into the large buffer B page 6 as shown in FIG. 11B, so that logical ordering is beginning to occur. The next page read from the index file I is page 5 and there is a zero value in the physical buffer PB, so this is a tree page. The next physical page read is page 6, which has an associated logical value of 4 and therefore as shown in FIG. 11C the contents of leaf page 6 are placed in memory space page 4. This proceeds on through the various pages as shown in the sequence FIGS. 11D–11K. By FIG. 11K the entire index file I has been read, so that all the actual leaf page information is present in the large buffer B in its proper logical order, having been read from the physical location and transferred according to the physical buffer PB into the desired logical location. Therefore the large buffer B as indicated in FIG. 11K has all of the leaf pages in proper logical order.

It is then appropriate to write the leaf pages back to a new index file, building the particular root and tree pages as they fill up. Therefore the new index file structure would be as shown in FIG. 12. Again the root page R is always page 2, while in this case the first tree page T1 is page 9. It is noted that the particular entries in tree page T1 are the various leaf pages and they are in sequential order, i.e. 3, 4, 5, 6, 7 and 8. As the 8th page was the final leaf page for the particular tree page T1, and it filled the tree page, then the tree page T1 is written in page 9. Beginning at page 10 is the next series of sequential leaf pages. After they have all be written, in the example then the tree page T2 is written to page 14, which completes the operation of writing the particular index file. It is again noted that in actual use this writing process will be significantly more complex as there will be numerous levels of trees.

Therefore it can be seen through the processes shown from FIG. 9 to FIG. 10 to FIGS. 11A–11K and then to FIG. 12 that the leaf pages have been very quickly and very simply transferred so that the index file is reorganized from its original physically scattered logical order to a sequential physical and logical order so that DASD operations are greatly enhanced for logical traverses through the index file I. Therefore operations of the DB2 system are enhanced as desired. It is also noted that no conventional sort operation is used but rather only reads through the various tree levels to determine the leaf logical order, then a sequential reading of the leaf pages into memory followed by a writing from memory into an index file which was developed. It is noted that the two major DASD operations, the read to obtain all of the leaf pages and the write to develop the new index file, are both sequential operations. No major random operations are necessary after the development of the logical buffer LB. This greatly enhances performance, particularly as compared to a sorting operation which often utilizes many random accesses of the DASD device.

The flowcharts of FIGS. 13A, 13B, 14A and 14B illustrate sequences utilized to practice the method described above. The index reorganization sequence 100 is commenced to reorganize or reorder the particular index file. In step 102 the computer obtains the name of the particular index to be organized. In step 104 DB2 is called to determine the actual file name of the index file so that other system tools can be used to determine information about the index file. The file name is the A or C file, as appropriate. In step 105, if the INCONSISTENT STATE flag is set and the index is a non-partitioned index, the file name is changed from an A file to a C file. Having obtained the actual file name and done any necessary renaming, in step 106 the various system functions present on the computer are utilized to determine the actual DASD location of the index file and its size. This is so that simple file operations can be utilized without having to use the actual DB2 operations. Control then proceeds to step 108, where the index file is opened for random access. This is necessary to develop the tree page structure so that the logical buffer LB can be developed.

Control proceeds to step 110, where page 2, the root page, is read. In step 112 a determination is made as to whether page 2 is a leaf page. If so, this is a very small file. In the more conventional case, it is not a leaf page and control proceeds to step 114 to determine the number of pages immediately below what is now a root page. This is done by reading the number of particular page number entries in the root page. Then a first buffer is set up having that number of pages. After setting up the buffer in step 116, control proceeds to step 118 where the page numbers of the tree pages in logical order are written into this buffer. This then provides a first ordering of the tree, i.e. which branches are to be read first. Control then proceeds to step 120 so that a next level buffer can be developed. Preferably the buffer size is reserved according to the formula $$n=p(4049/(k+3)+1)$$

where n is the number of pages at the next level, p is the number of pages at the current level and k is the length of the key field used in the particular index file. This allows an estimated buffer size that is at least as long as necessary to allow development of the ordering.

Control then proceeds to step 122 to read the first page indicated by the current level buffer written in step 118. If this particular page is a leaf page as determined in step 124, then the tree has been fully traversed and the information present in the current level buffer is the logical mapping, so that the current level buffer is the logical buffer LB. If this is not the case and it is another tree page, at least one more level must be traversed and so control proceeds to step 126 where the page numbers in logical order for the current tree page of the current level are read and placed into the next level buffer which has been developed. The current tree page is incremented so that the next actual tree page is read.

Control then proceeds to step 128 to determine if the last tree page in the current level was read. If not, control returns to step 126. By this manner the entire current tree level is traversed until all of the pages in logical order at the next lower level are present in logical order in the next level buffer being filled.

If the last tree page had been read in step 128, control returns to step 120 where the next level buffer is again developed. Control proceeds to step 122 to again read the first page indicated by the current level buffer. In this case it is assumed to be a leaf page as we have traversed to the end and control then proceeds to step 130, which is also where control proceeds from step 112 if the root page was indeed was a leaf page. In step 130 the physical buffer PB is set up such that one word is present for each page in the index file and all the values in the physical buffer PB are zeroed to allow indication of the various root and tree pages when the index file is read. Control then proceeds to step 132 (FIG. 13B) where the transposition from the logical buffer LB to the physical buffer PB is performed. This is the transposition as shown from FIG. 9 to FIG. 10. After the transposition has been completed in step 132, control proceeds to step 134 where the index file is closed as a random access file and is opened as a sequential access file to allow fast and optimal reading of the index file I. Control then proceeds to step 136 where a non-clustering index write routine 200 (FIG. 14A) is commenced. As the particular entries will have to ultimately be written to a new index file, the B file, it is desirable that the various write operations occur as concurrently as possible with the particular read operations where the large buffer is filled. In the normal case the particular index files can be quite long and generally are not horribly disorganized, so it is usually possible to begin writing the early portions of the index file structure and the early leaf pages while the order sequence 100 is completing the final pages. This allows some overlapping given the length of the particular index files and helps speed overall operations.

Control then proceeds to step 138 where the large buffer B is set aside in the memory, with one page set aside per leaf page of the index file. Control then proceeds to step 140 where a mapping table is set up with one byte available per leaf page. The values of the map table are also cleared in step 140. The map table is used as a pointer to indicate whether a particular page in the large buffer B has been filled. This is used by the write sequence 200 to determine when the next block of leaf pages can be written to the new index file. Control then proceeds to step 142 where the next page in the current index file which is being reorganized is sequentially read. Control proceeds to step 144 where the physical page number is used as a look up into the physical buffer PB to determine the logical order of this particular leaf page. Control proceeds to step 146 to determine if the page is a tree page. If so, control proceeds to step 148. If not, control proceeds to step 150 where the leaf page is written into the logical page number location in the large buffer B and a value of FF is written to the associated map table location to indicate that this page in the large buffer B has been occupied. Control then proceeds to step 148, where the sequential page number is incremented. Control then proceeds to step 152 to determine if the last page in the index file has been read. If not, control returns to step 142 and the process continues until all of the leaf pages have been read in physical order and placed in logical order in the large buffer B. If the last page was read, control proceeds to step 154 which is the end of the order sequence 100.

As noted above, the index write sequence 200 (FIG. 14A) is used to write the leaf pages which have been placed into the large buffer B back into a new index file which is then converted to be the index file that has been reorganized. The non-clustering index write sequence 200 commences at step 202 where the names of the new or B and old or A index files are obtained. Control proceeds to step 204 to determine the actual file name of the old index file, in a manner similar to that of step 104. Control proceeds to step 206 where the actual file size and type of the old index file is obtained in a manner like that of step 106. Control proceeds to step 208 where a new or B index file of the same type and size, but having a different name, is set up. This new index file will become the reorganized index file. Control then proceeds to step 210, where this B index file is set up for sequential write operations. In step 212 the header information and space map information is written to pages 0 and 1. Control then proceeds to step 214 where a dummy root page is written to page 2 of the new index file. As the root page is not determined until one of the last steps, as it is the highest level and all the tree pages must have been developed, a dummy must be written in this case to allow the sequential operations. Control then proceeds to step 216 where a map table pointer is set to a value of 1. This is so that tracking through the map table can be developed. Control then proceeds to step 218 where the next 16 table entries in the map table are checked to determine if they are all equal to the value FF. If not, control proceeds to step 220 (FIG. 14B) to determine if all of the input pages have been processed. If not, control proceeds to step 222 to wait momentarily as now the write sequence 200 has gotten ahead of the read operation and placement in memory of the order sequence 100. Control proceeds from step 222 to step 218 so that this process continues until 16 entries are available.

If 16 entries were available in step 218, control proceeds to step 224, where the map table value is incremented by 16 and a pointer is indicated to a first buffer which is used to build leaf pages. Control then proceeds to step 226 where the 16 leaf pages are obtained from the large buffer B and provided to a DB2 rebuild operation and finally written sequentially to the new index file. It is noted that any RID values contained in the index must first be translated from old RID values to new RID values before the values are written as the RID values will change because the data table is also being reorganized. The translation is done using either the TSRID1 or TSRID3 buffers described below. Control then proceeds to step 228 to add the highest key value contained for those particular 16 leaf pages to the tree page of the next level up which is slowly being developed. Control then proceeds to step 230 to determine if the particular tree page which is being developed is full. If so, control proceeds to step 232 where the tree page is then written to the index file. If not, control proceeds to step 234 to determine if any more of the 16 input pages which are being transferred are present. If so, control proceeds to step 226 and the leaf page is rebuilt according to DB2 format and written sequentially. If there are no more pages from the 16 particular pages being written, control proceeds to step 220 to again determine if all the input pages are completed. Assuming they are not, control proceeds to step 222 and then to step 218 so that in this manner the write sequence 200 generally tracks and walks up the large buffer B until all of the leaf pages have been written.

If in step 220 all of the input pages have been processed, control proceeds to step 236 where the final leaf page is written to the index file. Control then proceeds to step 238 where this last leaf page is written to the previous prior level up tree page. Control then proceeds to step 240 to determine if the if the tree page was a root page. If the tree page which has now been completed is not a root page, control proceeds to step 242 where the tree page is written into the new index file. Control then returns to step 238 where this final entry is then placed into the tree page at again the next level up and control then proceeds to step 240. This loop is continued until finally all of the tree pages have been completed and the final entry is ready to be made into the root page.

When the root page receives its final entry, control proceeds from step 240 to step 244 where the new index file is closed as a sequential write and is opened as a random write because now it is time to write the appropriate root page. Control then proceeds to step 246 where the developed root page is written to page 2 of the index file I. Control proceeds to step 248 where random access to the new index file is closed and then on to step 250 where the memory utilized by the large buffer, the map table and various other buffers is released. Control then proceeds to step 252 where the completion of the write operation is checkpointed. Control then proceeds to step 254 which is the end of the write sequence 200.

In a possible enhancement, it may be appropriate to scan the logical buffer LB and obtain the first few logical leaf pages in a random fashion before beginning the sequential operation of step 142 and on. One appropriate case for this operation would be when a high percentage of the first logical pages are near the physical end of the index file. If this is the case, the write sequence 200 will have little actual concurrency with the order sequence 100, as the write sequence 200 would have to wait until the end of the index file is read into the large buffer B before the first 16 entries are available for writing to the new index file. In this case, where there is a great disparity between logical and physical order for a short period, it may be more efficient to randomly read some leaf pages to allow greater actual concurrency between the order and write sequences 100 and 200 and a reduced total time.

Figure 15B:
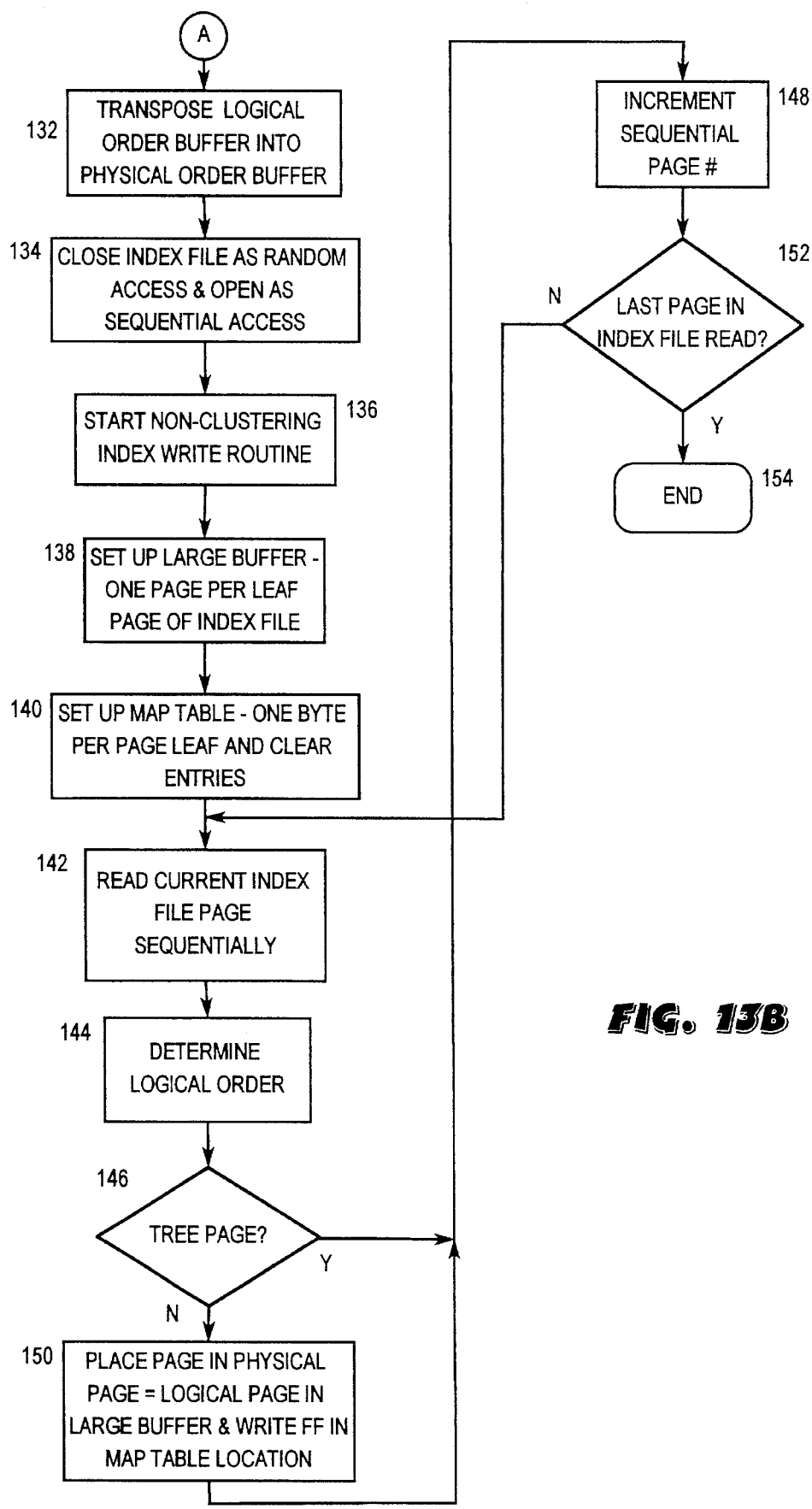
Figure 14A:
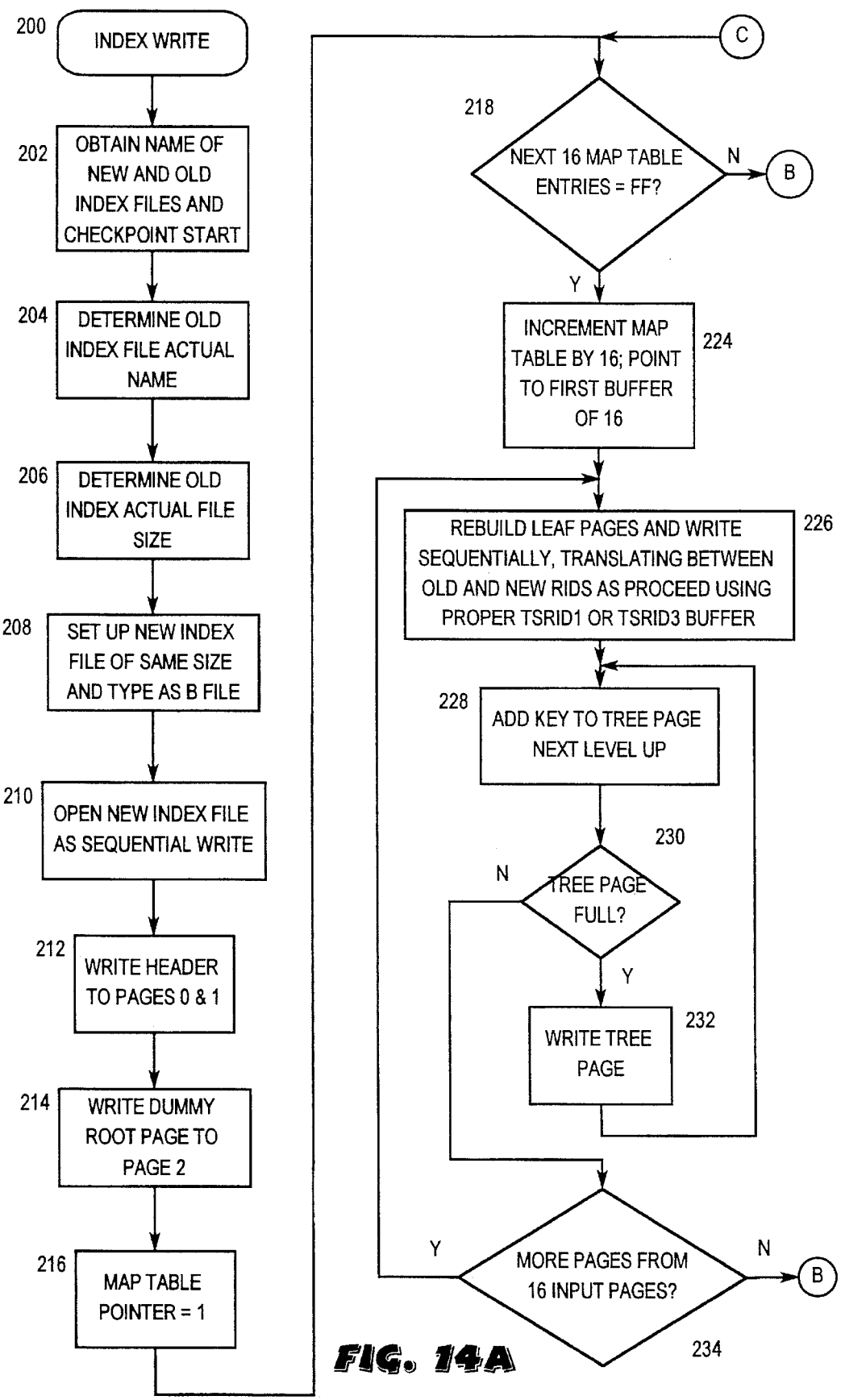
Figure 14B:
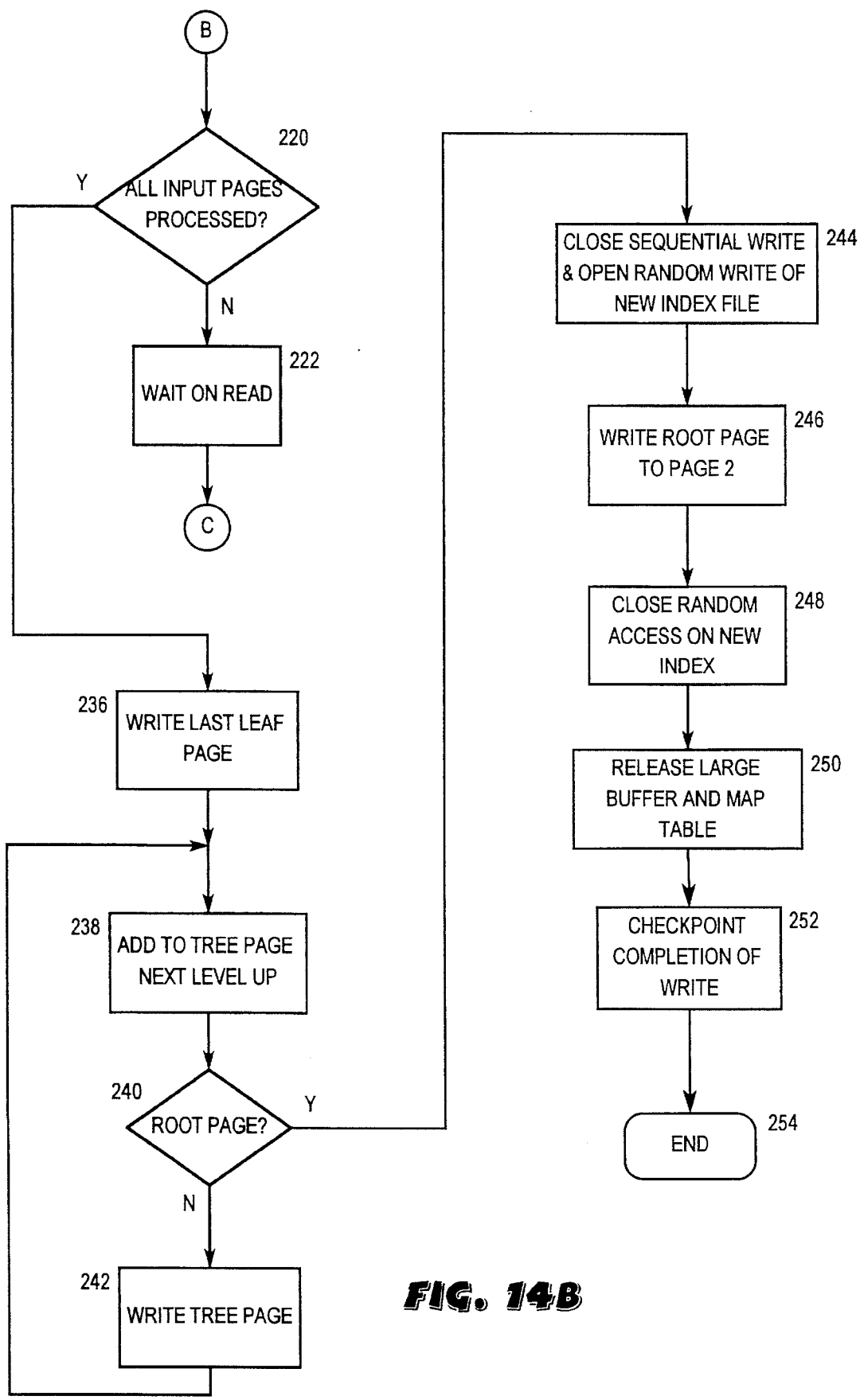

A disorganized table is a tablespace is shown in FIG. 15A. The row entries represent the key values of the clustering index, which should in order in an organized table. Again note that only a very simple example is utilized for illustrative purposes. FIG. 15B represents the table in organized or order form, where the records or data are sequentially organized. FIGS. 16A and 16B show representations of a clustering index or CLIX buffer for the table of FIGS. 15A and 15B. FIG. 16A shows the CLIX buffer in disorganized format, wherein the keys are sequential but the RIDs are jumbled. FIG. 16B shows the CLIX buffer if the table were properly organized. The CLIX buffer is one buffer utilized during the table reorder and clustering index reorganization process.

Figure 17A:
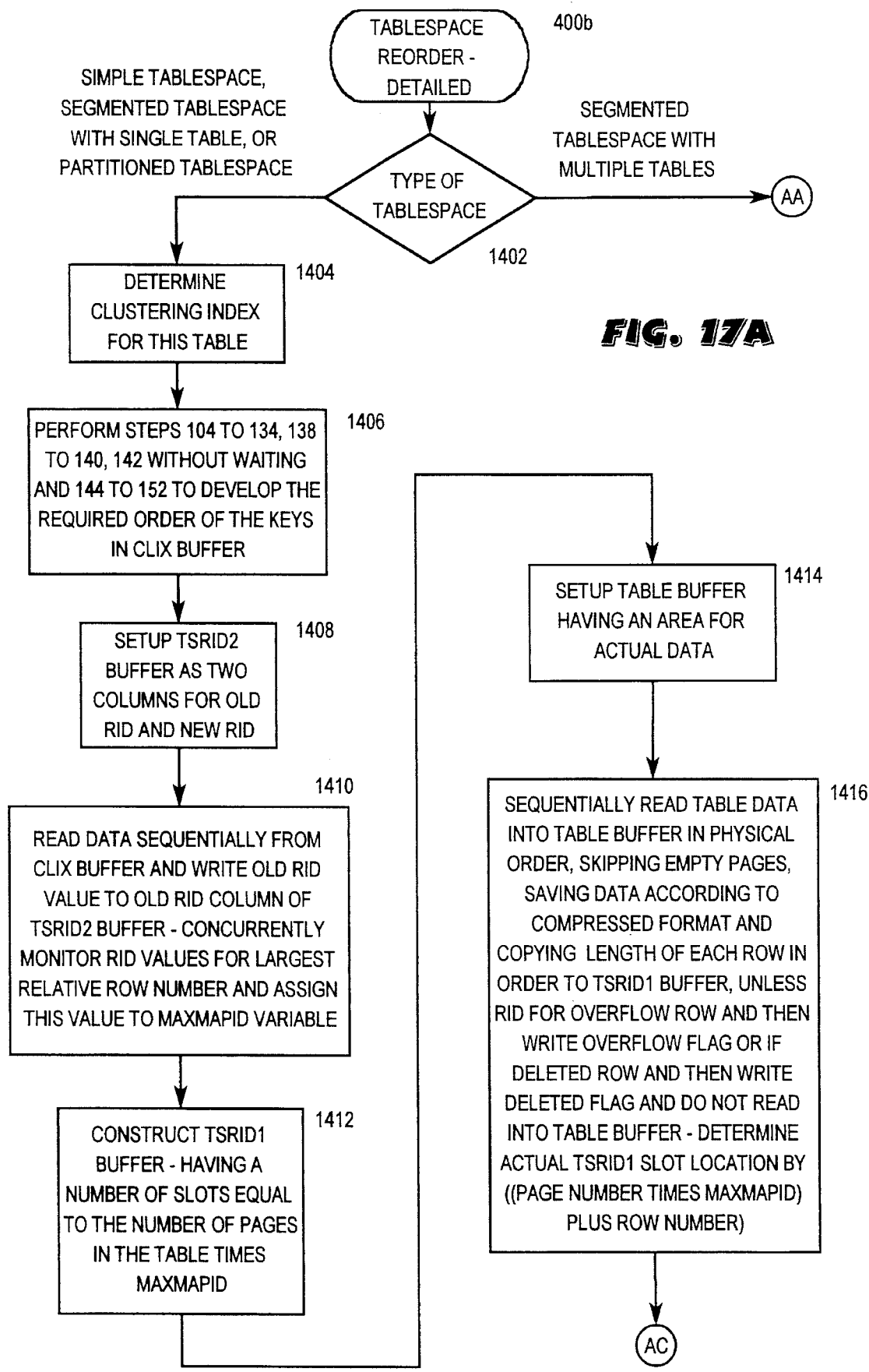
FIGS. 17A, 17B, 17C, 17D and 17E are a detailed flowchart of a sequence for reorganizing DB2 tables and clustering indices.

The detailed tablespace reorder sequence 400b (FIG. 17A) commences at step 1402 where a determination is made as to the type of tablespace. If it is a simple tablespace, a segmented tablespace with a single table or a partitioned tablespace, control proceeds to step 1404 where the clustering index of the particular table being reordered is determined. Control then proceeds to step 1406 where steps 104 to 134 and 138 to 152 of the non-clustering index reorganization sequence 100 are performed to develop the required order of the keys in the clustering index. This thus provides the CLIX buffer which includes the key numbers in sequence and the associated old RID numbers. Control then proceeds to step 1408 where a TSRID2 buffer is set up as two columns, the first for the old RID number and the second for the new RID number, the number of rows equalling the number of rows in the table. While this information could be obtained from the CLIX buffer, the use of the TSRID2 buffer is preferred for speed reasons. Each entry in the CLIX buffer may actually be quite large, as the key may have a maximum length of 256 bytes, while the TSRID2 buffer uses only 4 bytes per column entry or 8 bytes per row. This smaller size greatly improves processing speeds. Control then proceeds to step 1410 where the CLIX buffer is read sequentially to obtain the old RID value, which is written to the old RID column of the TSRID2 buffer, thus properly sequencing the TSRID2 buffer. Concurrently with this reading and writing operation the RID values are monitored for the largest relative row number in any particular page and this row number is assigned to a variable referred to as MAXMAPID.

Control then proceeds to step 1412 where a TSRID1 buffer is constructed having a number of slots in the buffer equal to the number of pages of the particular table times the MAXMAPID variable value. Control then proceeds to step 1414, where a table buffer is set up in memory having an area for the data. Control then proceeds to step 1416 where the table data is sequentially read into the table buffer in physical order, skipping any empty pages and saving the data according to a compressed format in the reserved memory area.

As the total size of the table data can be large, space saving techniques are preferably used when the data is stored. The preferred technique includes grouping pages into segments of 16 pages each, with each segment starting on a 32 byte boundary. The relative number of this 32 byte boundary is saved in a memory area referred to as the segment reference table. The segment reference table thus contains one word per 16 pages of table data and the value is the relative 32 byte cell number where a particular segment begins. Each segment area in turn begins with 16 one word offsets to the beginning of the data for that page relative to the beginning of the segment. Therefore, to find the beginning of the data for a particular page, the page number is divided by 16 and this value multiplied by 4 to provide the offset into the segment reference table. The value at this location is the cell number to the particular segment data which, when multiplied by 32, is the offset into the table data where the segment begins. Any remainder from dividing the page number by 16 is the relative page number of the segment and when multiplied by 4 is the offset into the segment header which is used to obtain the offset in the segment which indicates where the actual page data begins. Thus a particular page can be accessed without searching using only a few computations.

The data for the particular page is saved in a format which also allows access to an individual row without searching. As DB2 keeps MAPIDs at the end of each page, the MAPIDs being two byte offsets computed from the beginning of the page for each of the table rows. It is noted that the MAPIDs are numbered sequentially from the end of the page forward. The MAPIDs can then be used for computation purposes. Preferably the MAPIDs are placed at the beginning of each page of data, after a prefix which indicates the length of the MAPID section. To access a specific row of data, the process determines the MAPID by determining the page address plus the prefix value minus twice the row number. The MAPID value, plus the page address plus the page length minus 20 produces the address to the actual row data. Therefore a particular row within a page can also be determined without searching.

Figure 18:
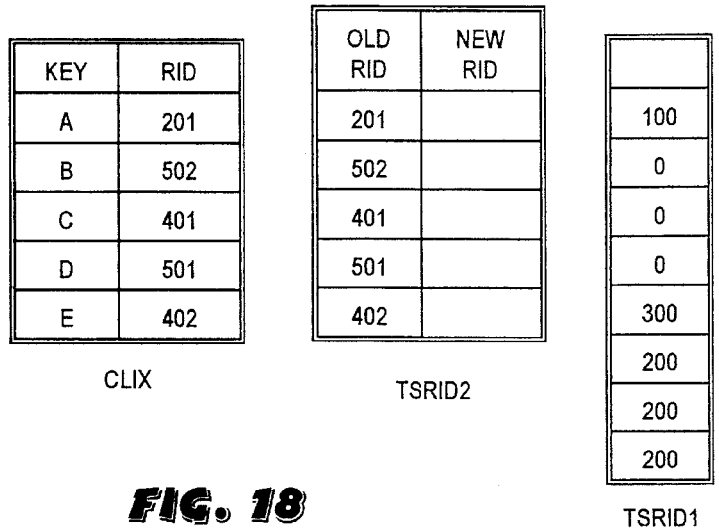
FIG. 18 is a representation of various buffers used with the sequence of FIGS. 17A–C.

Additionally in step 1416, the length of each row is copied in order from the table buffer to the TSRID1 buffer unless the RID value indicates an overflow row, a row which has been replaced and cannot fit in the originally allotted space, in which case an OVERFLOW flag is written. This will allow later reference to determine the actual RID value for the overflow row. Alternatively, if the row is a deleted row, a DELETED flag is written and the row is not written to the table buffer. The TSRID1 buffer slot location is determined by multiplying the page number, as indicated in the RID, times the MAXMAPID variable and adding the row number. The CLIX, TSRID2 and TSRID1 buffers are shown in a simple example in FIG. 18.

Figure 17B:
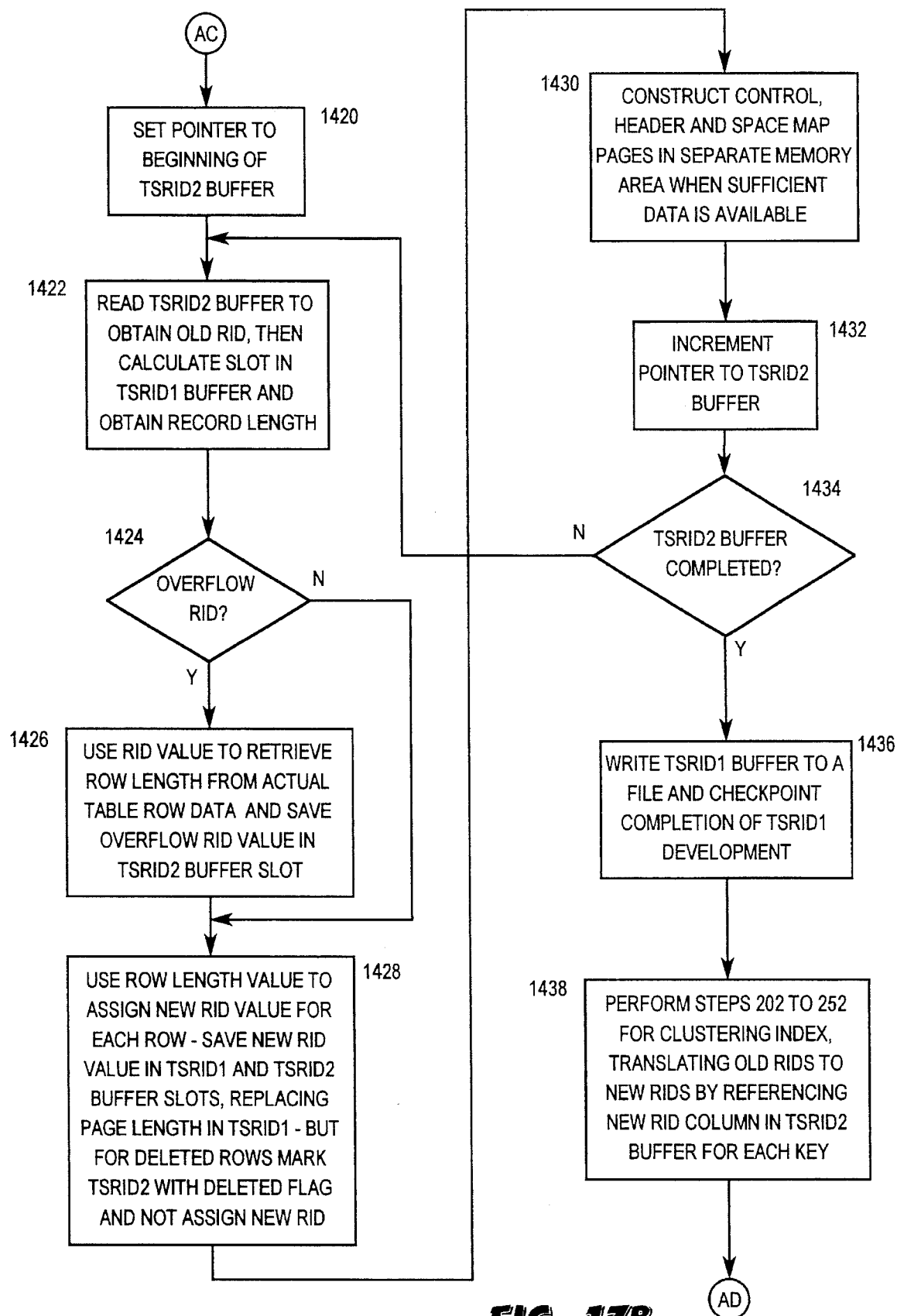
Figure 17C:
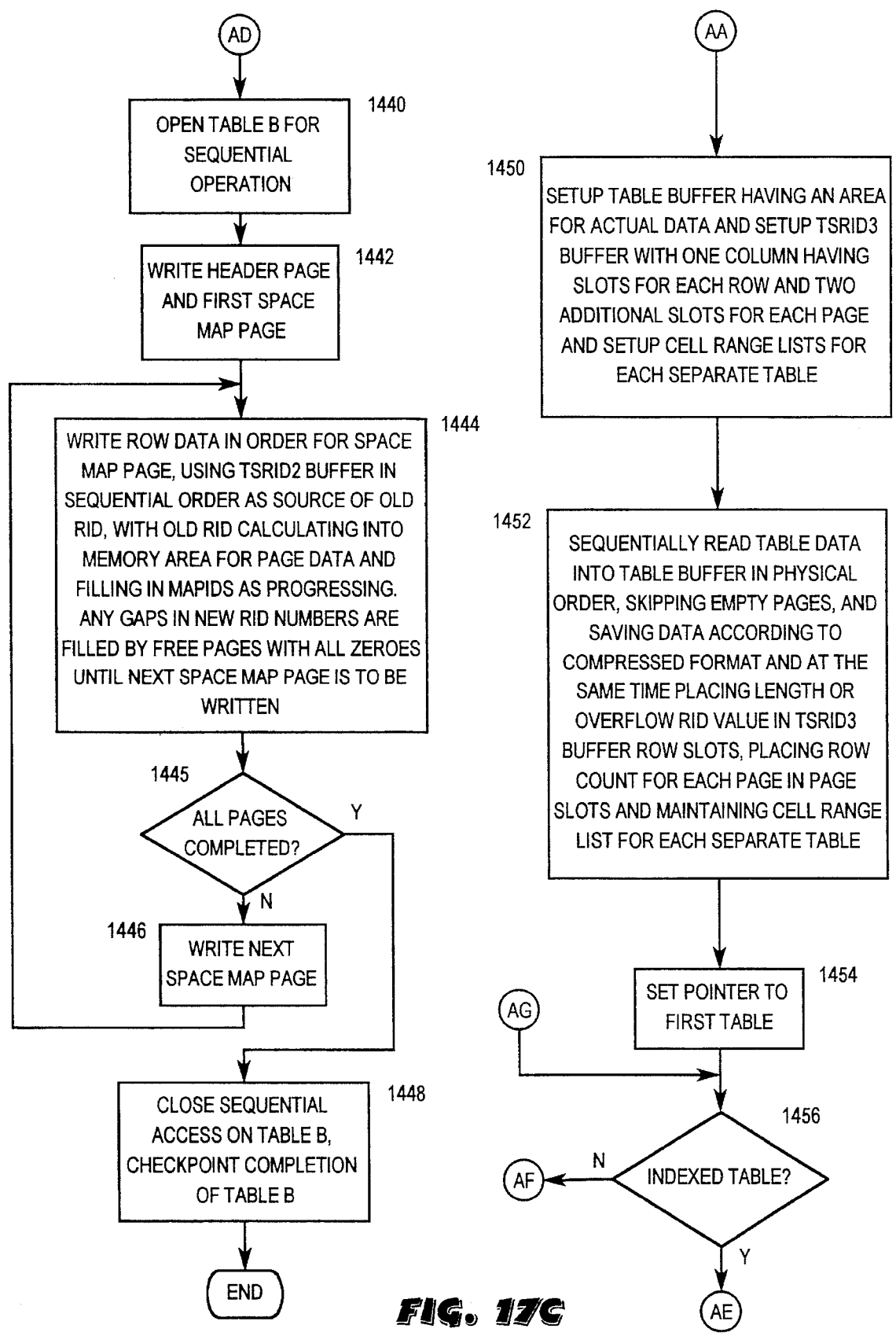
Figure 17D:
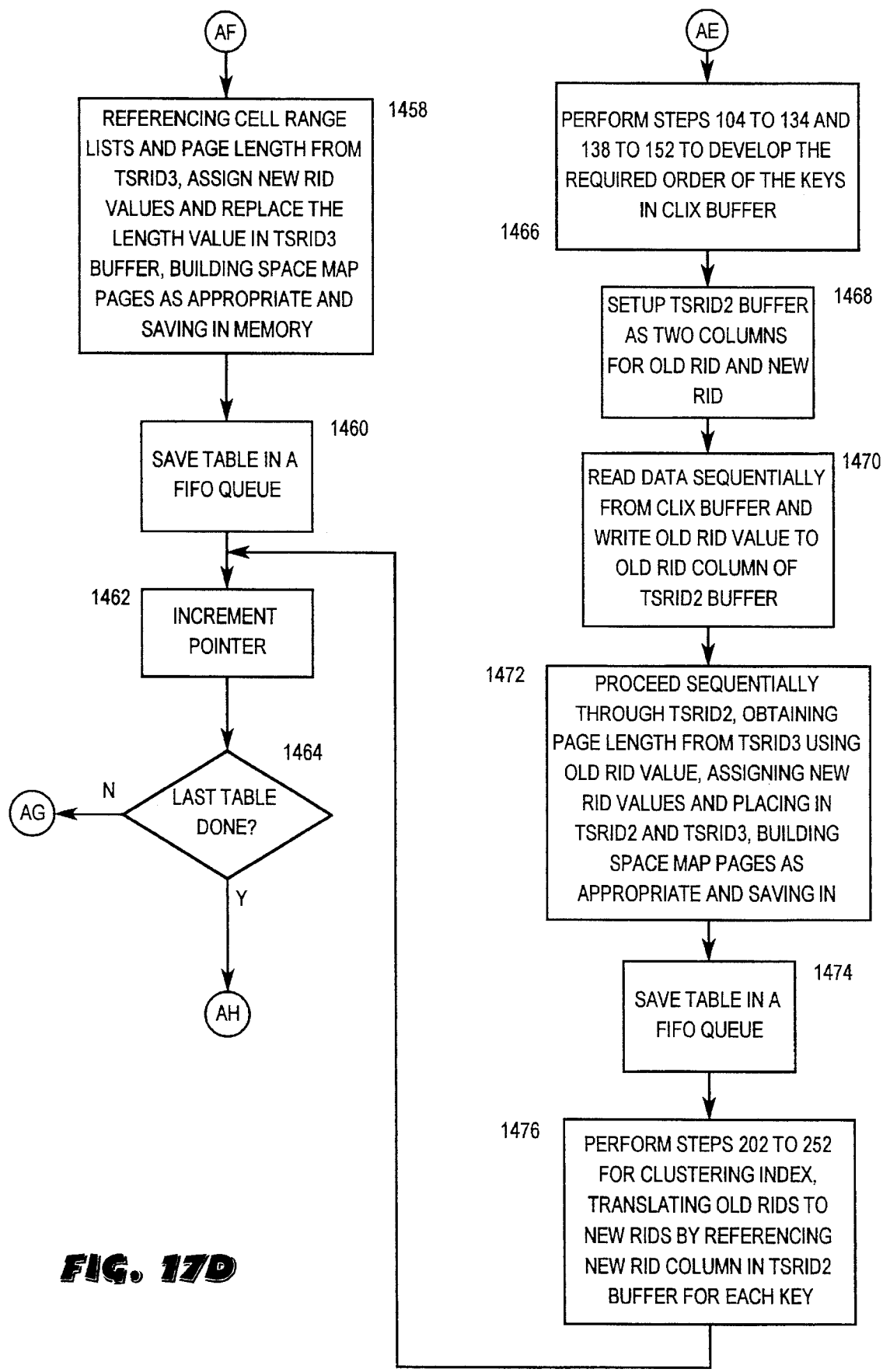
Figure 17E:
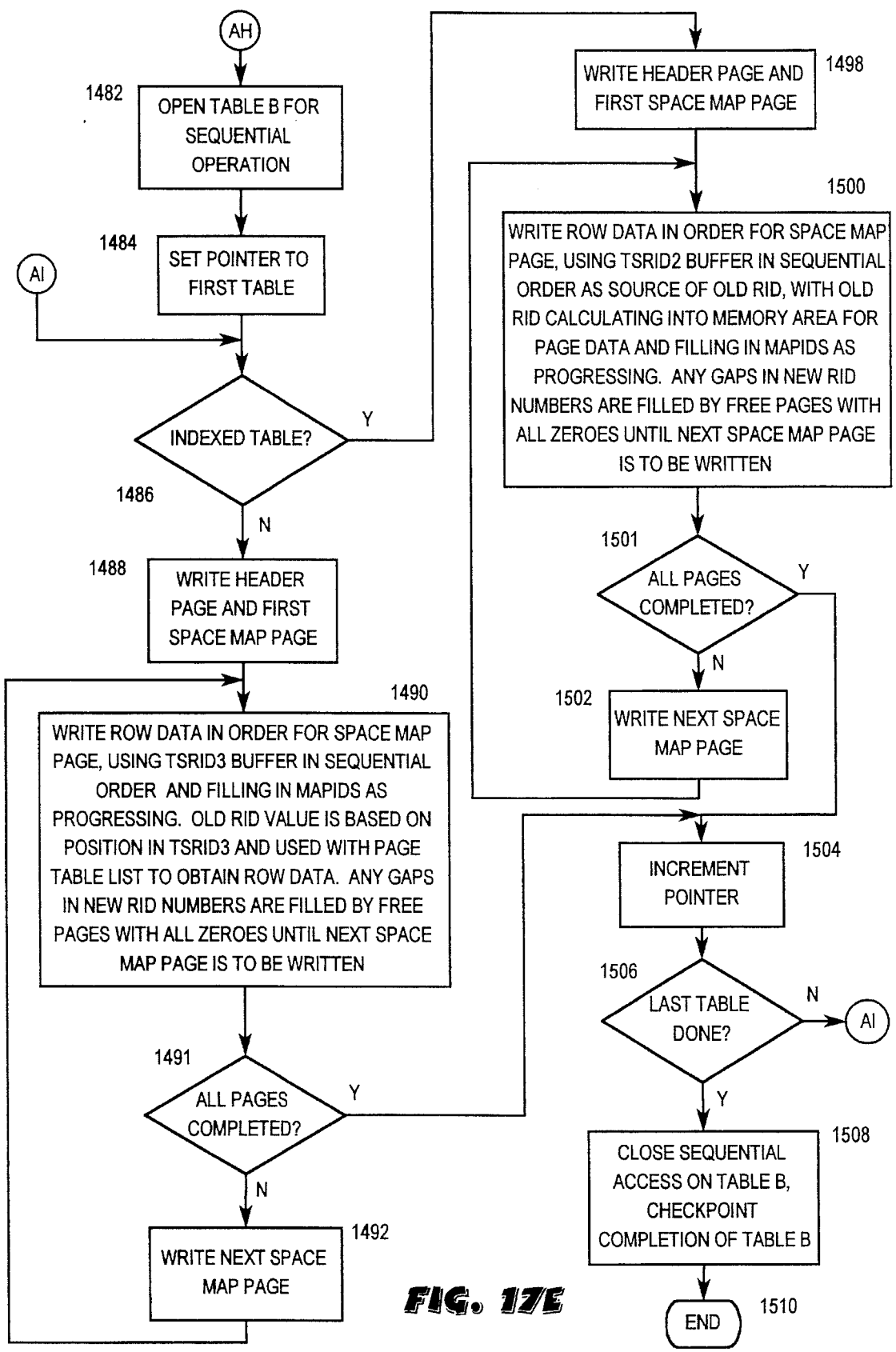

Control proceeds from step 1418 to step 1420 (FIG. 17B) where a pointer is set to the beginning of the TSRID2 buffer. Control then proceeds to read the TSRID2 buffer to contain the old RID value and then to calculate the slot in the particular TSRID1 buffer as noted above to obtain the record length for that row. Control proceeds to step 1424 to determine if the OVERFLOW flag was set. If so, control proceeds to step 1426 where the overflow RID value is used to retrieve the actual row length from the table row data, entry calculated as noted above. The actual overflow RID value is saved in the TSRID2 buffer slot as the old RID value. After step 1426 or if there is not an overflow RID as indicated in step 1424, control proceeds to step 1428 where the row length value is used to assign a new RID value for each row. The row length is utilized because a particular page has only a given size and once the given page has been filled up, a new page must be used. Thus the row lengths are added for each page until an overflow occurs, at which time a new page is allocated. As this task proceeds, the relative row number is determined by the entry number in the page and the page number is tracked in an incrementing manner. However, if the DELETED flag is set, then the TSRID2 buffer also receives the DELETED flag and a new RID value is not determined.

Figure 19A:
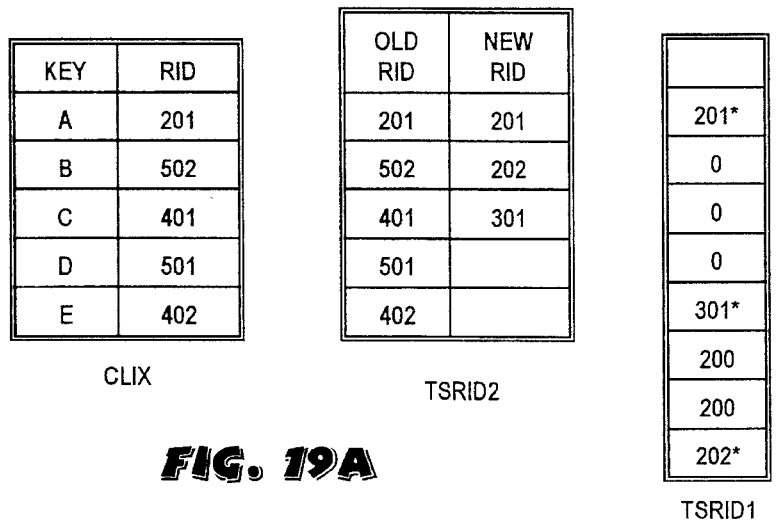
FIGS. 19A and 19B are representations of the buffers of FIG. 18 during and after reorganization.
Figure 19B:
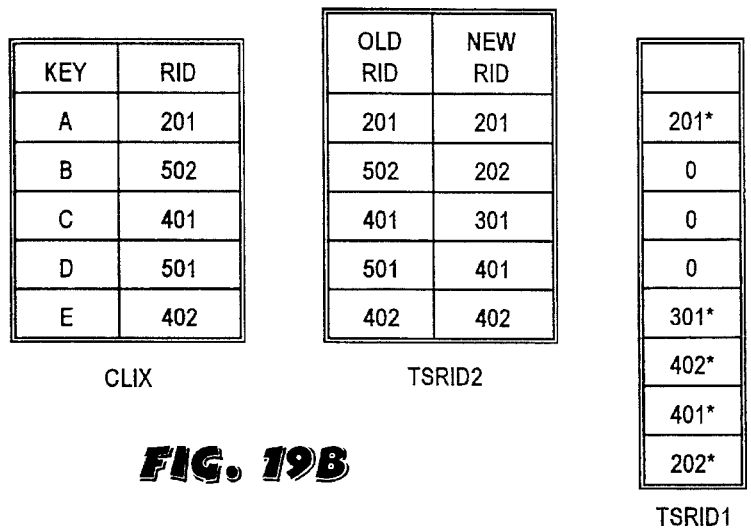

After the new RID value has been obtained in step 1428, it is saved as the new RID value in the TSRID1 and TSRID2 buffer slots for that row. Note that this replaces the page length value in the TSRID1 buffer. This process is shown in intermediate and final state in FIGS. 19A and 19B. Note that new RID values are being added to the TSRID2 buffer and new RID values are replacing row lengths in the TSRID1 buffer. Control then proceeds to step 1430, where header page and space map pages are constructed in a separate memory area when there is sufficient data to develop the particular page. The header page is developed immediately upon the first operation and the space map pages are developed as pages are filled up. Control then proceeds to step 1432 where the pointer to the TSRID2 buffer is incremented. Control proceeds to step 1434 to determine if the RID calculation operation using the TSRID2 buffer has been completed. If not, control returns to step 1422 and the sequence is performed until the entire TSRID2 buffer has been traversed and all of the new RID values have been determined.

When all the new RID values have been determined, control proceeds to step 1436 where the TSRID1 buffer is written to a file and completion of the TSRID1 buffer is checkpointed. It is noted that the TSRID1 file thus contains the new RIDs in the sequential order of the keys. Control then proceeds to step 1438 where steps 202 to 252 are performed for the clustering index, noting of course that the old RID values are translated to the new RID values by reference to the new RID column in TSRID2 buffer for each particular key. Control then proceeds to step 1440, where a table B file is opened for sequential operation. In step 1442 the header page and the first space map page are written to the table B. Proceeding then to step 1444, the row data is written in order for the space map page, using the TSRID2 buffer in sequential order as the source of the old RID value, with the old RID value being utilized to calculate the entry into the memory area for the particular row of data. The MAPIDs are developed as the write operation progresses. Any gaps in the new RID numbers as noted in the TSRID2 buffer are free pages with all data in the row being 0 this process continues until the next space map page is to be written. Control then proceeds to step 1445 to determine if all the pages have been written. If not, control proceeds to step 1446 where the next space map page is retrieved from memory and written to the table B file. Control then proceeds to step 1444 and the data for that page is written. This process repeats until all the data has been written. Control proceeds from step 1445 to step 1448 when all the pages have been written. In step 1448 sequential access to the table B file is closed and the completion of the table B write operation is checkpointed.

If it was determined in step 1402 that this is a segmented tablespace with multiple tables, control proceeds to step 1450 where a table buffer is set up having an area to receive the actual data. Additionally, an area is set up for a TSRID3 buffer, with that buffer having one column with slots for each row and an additional two slots for each page. Control then proceeds to step 1452, where the table data is sequentially read into the table buffer in physical order, skipping any empty columns and saving the data according to the compressed format discussed above. At the same time, the length of the particular row or the overflow RID value is placed in the TSRID3 buffer slot. The row count for each page is placed in the page slot and a cell range list for each separate table is maintained. A cell range list keeps track of the pages in each segment. An exemplary TSRID3 buffer is shown in FIG. 20A. Control then proceeds to step 1454, where a pointer is set to indicate the first segment or table. Control then proceeds to step 1456 to determine if this is an indexed table. If not, control proceeds to step 1458. In step 1458 by referencing the cell range list and the page length in the TSRID3 buffer, new RID values are assigned as noted above, which then replace the length value in the TSRID3 buffer, building the space map pages as appropriate and saving those in memory. This is illustrated in FIG. 20B where an intermediate state of reorganizing the table of FIG. 20A is shown. Control proceeds to step 1460 where the table is saved in the FIFO queue. Control then proceeds to step 1462, where the pointer value is incremented. Control proceeds to step 1464 to determine if the last table was completed. If not, control returns to step 1456.

If in step 1456 it was determined that this was an indexed table, control proceeds to step 1466 where steps 104 to 134 and 138 to 152 are executed to develop the required order of the keys in a CLIX buffer. Control proceeds to step 1468, where a TSRID2 buffer is set up, having columns for the old RID and the new RID values for each row. Control proceeds to step 1470, where the old RID values are read sequentially from the CLIX buffer and written to the old RID column of the TSRID2 buffer. Control proceeds to step 1472, where by proceeding sequentially through the TSRID2 buffer and obtaining the page length from the TSRID3 buffer using the old RID value to indicate position in the buffers, new RID values are assigned and placed in the TSRID2 and TSRID3 buffers. This process is shown in sequence from FIG. 21A, where all of the values have been placed in the buffers; to FIG. 21B, where an intermediate state is shown; and to FIG. 21C, the final state of the buffers. Additionally, the space map pages are built as appropriate and saved in memory. Control proceeds to step 1474, where the table is saved in the FIFO queue. Control then proceeds to step 1476, where steps 202 to 252 are performed for the clustering index, noting that the old RID values are translated to the new RID values by using the TSRID2 buffer. Control then proceeds to step 1462.

If at steps 1464 the last table was completed, control proceeds to step 1482 where a table B file is opened for sequential operation and to step 1484, where a pointer is set to the first table. Control proceeds to step 1486 to determine if this was an indexed table. If not, control proceeds to step 1488, where the header page and the first space map page are written to the table B file. Control then proceeds to step 1490, where the row data is written in order for the first pace map page using the TSRID3 buffer in sequential order and filing in the MAPIDs as progressing as discussed above. In this case the old RID values are based on the position in the TSRID3 buffer and are used with the page table list to obtain particular row data. Any gaps in new RID numbers are filed by free pages with all zeros until the next space map page is to be written. Control then proceeds to step 1491 to determine if all the pages have been written. If not, control proceeds to step 1492, where the next space map page is written to the table B file. Step 1490 is then re-executed and this continues until all pages have been written. When all the pages have been written, control proceeds from step 1491 to step 1504, where the pointer value is incremented. Control proceeds to step 1506 to determine if the last table is completed. If not, control returns to step 1486.

If in step 1486 it was determined that it was an indexed table, control proceeds to step 1498, where the header page and the first space map page are written to the table B file. Control then proceeds to step 1500, where the row data is written in order for the first space map page using the TSRID2 buffer in sequential order as the source of the old RID value. The old RID value is used to calculate into the memory area to determine the length of the row data for determining new RID values. Any MAPIDs are developed as the process is progressing. Any gaps in the new RID numbers are filled in by free pages with all zeros, until the next space map page is to be written. Control then proceeds to step 1501 to determine if all the pages have been written. If not, control proceeds to step 1502, where the next space map page is written and then to step 1500 to repeat the page data writing operation. When all the data pages have been written, control proceeds from step 1501 to step 1504. If not, control returns to step 1486. If step 1506 determines that the last table has been completed, control proceeds to step 1508 where sequential access to the table B file is closed and the completion of the table B write operation is checkpointed. Control then proceeds to step 1510, which is a completion or end of the sequence.

As previously stated, all of the operations to the table data to and from DASD are performed sequentially, thus greatly improving DASD performance. Further, no conventional sorting is done, which is a very cumbersome and slow process. Thus a second means of speed improvement is provided. Similar statements can be made for the operations with the clustering index. Various tests have shown a performance improvement of three to six times over conventional tablespace reorganization procedures.

The above-description has made only minor reference to the actual threads and multi-tasking that can be utilized. This was done for purposes of simplifying the explanation. As conventionally done in mainframe operation, many of the illustrated operations may actually be executing concurrently or started for operation, which then proceeds according to the operating system scheduling process. This concurrency may require certain tests in certain sequences to prevent overrunning, but this is conventional and can readily be provided by one skilled in the art.

Further, the above description has focused on DB2 tablespaces, but similar techniques can be used for databases developed in other formats, particularly tree-structured formats.

The foregoing disclosure and description of the invention are illustrative and explanatory thereof, and various changes in the method of operation may be made without departing from the spirit of the invention.

We claim:

1. A method for reorganizing a data table on a computer storage system, the data table organized into pages, each page storing a number of data rows based on the size of the data row, wherein row data location includes page number and relative row number and not having a related index, the method comprising the computer executed steps of:

sequentially reading the data rows into a data buffer having an area for receiving the data and copying the length of each data row to a length buffer having an entry for each data row, said length stored in said length buffer based on the original location of the data row;

determining a new location for each data row by sequentially obtaining the row length of each data row from said length buffer and using said row length to develop said new location, including using said row length to determine entry of each data row into a page and the relative row number in that page;

saving said new location in a position corresponding to the data row original location; and sequentially storing said data in a reorganized file by sequentially reading said data row from said data area and storing said read data row in said reorganized file.

2. The method of claim 1, wherein said step of saving said new location further saves said new location in said length buffer, replacing said row length.

3. The method of claim 1, wherein the data table further includes space map pages for identifying space in each of said pages, wherein said step of determining a new location further includes determining space map information for each new page and saving said space map information and wherein said step of storing said data includes retrieving said space map pages and storing said space map page for a given page in said reorganized file prior to storing said read row data for said given page.

4. A method for reorganizing a data table on a computer storage system, the data table being comprised of a plurality of data rows and having a related index, the method comprising the computer executed steps of:

reading the index to determine the logical order of the data and the original location of the data and storing the ordering information and original location in logical sequence in an index buffer having entries for each data row;

sequentially reading the data rows into a data buffer having an area for receiving the data and copying the length of each data row to a length buffer having entries for each data row, said length stored in said length buffer based on the original location of the data row;

determining a new location for each data row by sequentially obtaining the row length of each data row from said length buffer using said original location and using said row length to develop said new location;

saving said new location in a position corresponding to the data row original location; and sequentially sorting said data in a reorganized file by determining the original location of each data row in logical sequence, reading said data row from said data area using said original location and storing said read data row in said reorganized file.

5. The method of claim 4, wherein said step of reading the data rows saves said data rows in said data buffer in a compressed format allowing determination of a given data row location using only calculations and table lookups and without using searching techniques.

6. The method of claim 4, wherein said index has a tree structure with tree and leaf pages, the tree pages for indicating the logical order of tree pages and leaf pages and wherein said step of reading the index includes the steps of:

reading the tree pages to determine the logical order of the leaf pages;

preparing a buffer correlating the leaf page physical position with its logical position for each leaf page;

preparing a large buffer for receiving a copy of all the leaf pages in the index;

sequentially reading the leaf pages from the index; and for each sequentially read leaf page, determining its logical position by reference to said physical to logical buffer and placing the read leaf page in said large buffer and placing the read leaf page in said large buffer at a location corresponding to its logical location, wherein said large buffer is said index buffer.

7. The method of claim 4, further comprising the steps of:

sequentially copying the original location of the data rows into a location buffer from said index buffer, said location buffer further including a new location position associated with each original location, and wherein said step of saving said new location saves said new location in said location buffer, whereby said original location and said new location are associated and wherein said step of storing said data determines said original location by referencing said location buffer in sequential order.

8. The method of claim 7, wherein said step of saving said new location further saves said new location in said length buffer, replacing said row length.

9. The method of claim 4, wherein said data table is further organized into pages, each page storing a number of data rows based on the size of the data row, wherein row data location includes page number and relative row number and wherein said step of determining a new location further includes using said row length to determine entry of each data row into a page and the relative row number in that page.

10. The method of claim 9, wherein the data table further includes space map pages for identifying space in each of said pages, wherein said step of determining a new location further includes determining space map information for each new page and saving said space map information and wherein said step of storing said data includes retrieving said space map pages and storing said space map page for a given page in said reorganized file prior to storing said read row data for said given page.

11. The methods of claim 9, further comprising the step of:

determining the largest relative row number in any page and the total number of pages, and wherein said length buffer has a number of entries equalling the largest relative row number times the total number of pages.

12. The method of claim 11, wherein said step of copying the length of the data row places the length in the entry corresponding to the page number times the largest relative row number plus the relative row number for the data row and wherein said step of determining a new location obtains the length by multiplying the page number by the largest relative row number and adding the relative row number.

13. A method for reorganizing a data table and a related index on a computer storage system, the data table being comprised of a plurality of data rows, the method comprising the computer executed steps of:

reading the index to determine the logical order of the data and the original location of the data and storing the ordering information and original location in logical sequence in an index buffer having entries for each data row;

sequentially reading the data rows into a data buffer having an area for receiving the data and copying the length of each data row to a length buffer having entries for each data row, said length stored in said length buffer based on the original location of the data row;

determining a new location for each data row by sequentially obtaining the row length of each data row from said length buffer using said original location and using said row length to develop said new location;

saving said new location in a position corresponding to the data row original location;

sequentially storing the entries in said index buffer in a reorganized index file using the new locations;

sequentially storing said data in a reorganized file by determining the original location of each data row in logical sequence, reading said data row from said data area using said original location and storing said read data row in said reorganized file.

14. The method of claim 13, wherein said step of reading the data rows saves said data rows in said data buffer in a compressed format allowing determination of a given data row location using only calculations and table lookups and without using searching techniques.

15. The method of claim 13, further comprising the steps of:

sequentially copying the original location of the data rows into a location buffer from said index buffer, said location buffer further including a new location position associated with each original location, and wherein said step of saving said new location saves said new location in said location buffer, whereby said original location and said new location are associated, wherein said step of storing the entries in said index buffer replaces said original locations with new locations and wherein said step of storing said data determines said original location by referencing said location buffer in sequential order.

16. The method of claim 15, wherein said step of saving said new location further saves said new location in said length buffer, replacing said row length.

17. The method of claim 13, wherein said index has a tree structure with tree and leaf pages, the tree pages for indicating the logical order of tree pages and leaf pages and wherein said step of reading the index includes the steps of:

reading the tree pages to determine the logical order of the leaf pages;

preparing a buffer correlating the leaf page physical position with its logical position for each leaf page;

preparing a large buffer for receiving a copy of all the leaf pages in the index;

sequentially reading the leaf pages from the index; and for each sequentially read leaf page, determining its logical position by reference to said physical to logical buffer and placing the read leaf page in said large buffer and placing the read leaf page in said large buffer at a location corresponding to its logical location, wherein said large buffer is said index buffer.

18. The method of claim 17, wherein said step of reading the index further includes the step of:

preparing a buffer correlating the leaf page logical position to its physical position for each leaf page; and wherein said step of preparing said physical to logical buffer includes transposing said logical to physical buffer.

19. The method of claim 17, wherein said step of storing the entries in said reorganized index includes the step of:

developing tree pages as the leaf pages are stored and storing said tree pages to said reorganized index as filled in sequence with the leaf pages.

20. The method of claim 13, wherein said data table is further organized into pages, each page storing a number of data rows based on the size of the data row, wherein row data location includes page number and relative row number and wherein said step of determining a new location further includes using said row length to determine entry of each data row into a page and the relative row number in that page.

21. The method of claim 20, wherein the data table further includes space map pages for identifying space in each of said pages, wherein said step of determining a new location further includes determining space map information for each new page and saving said space map information and wherein said step of storing said data includes retrieving said space map pages and storing said space map page for a given page in said reorganized file prior to storing said read row data for said given page.

22. The methods of claim 20, further comprising the step of:

determining the largest relative row number in any page and the total number of pages, and wherein said length buffer has a number of entries equalling the largest relative row number times the total number of pages.

23. The method of claim 22, wherein said step of copying the length of the data row places the length in the entry corresponding to the page number times the largest relative row number plus the relative row number for the data row and wherein said step of determining a new location obtains the length by multiplying the page number by the largest relative row number and adding the relative row number.

* * * * *